United States Patent
Uehlein-Proctor et al.

(10) Patent No.: US 7,926,187 B2
(45) Date of Patent: Apr. 19, 2011

(54) BAND SAW

(75) Inventors: Nancy Uehlein-Proctor, Nashotah, WI (US); Dennis J. Grzybowski, New Berlin, WI (US); Jeffrey S. Holly, Menomonee Falls, WI (US); Scott D. Bublitz, Hartland, WI (US); Boyd J. Miller, Mequon, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 11/061,057

(22) Filed: Feb. 18, 2005

(65) Prior Publication Data

US 2005/0188550 A1    Sep. 1, 2005

Related U.S. Application Data

(60) Provisional application No. 60/546,489, filed on Feb. 20, 2004, provisional application No. 60/623,422, filed on Oct. 28, 2004.

(51) Int. Cl.
*B23D 53/12*    (2006.01)
*B25F 5/00*    (2006.01)
*B27B 13/00*    (2006.01)

(52) U.S. Cl. ............................ 30/380; 30/500; 30/DIG. 1

(58) Field of Classification Search .................. 30/298.4, 30/380, 500, DIG. 1; 83/788; 320/114; D8/64; 310/50

See application file for complete search history.

(56) References Cited

U.S. PATENT DOCUMENTS

| 1,476,238 | A | 12/1923 | Bump |
| 1,786,925 | A | 12/1930 | Wiegelmann |
| 2,510,471 | A | 6/1950 | Horstkotte |
| 2,525,588 | A | 10/1950 | Cameron et al. |
| 2,596,081 | A | 5/1952 | Sacrey |
| D167,415 | S | 8/1952 | McCabe |
| 2,698,034 | A | 12/1954 | Jakku |
| D180,754 | S | 8/1957 | Sweeney et al. |
| D180,815 | S | 8/1957 | Bentley |
| 2,841,192 | A | 7/1958 | Martin |
| D197,170 | S | 12/1963 | Steiner |
| 3,504,716 | A | 4/1970 | Bush et al. |
| 3,656,391 | A | 4/1972 | Von Arx |
| 3,735,489 | A | 5/1973 | Zatorsky, Jr. |
| 3,829,970 | A | 8/1974 | Anderson |
| 3,886,658 | A | 6/1975 | Wikoff |

(Continued)

FOREIGN PATENT DOCUMENTS

EP    0 979 711    2/2000

(Continued)

*Primary Examiner* — Laura M. Lee
(74) *Attorney, Agent, or Firm* — Michael Best & Friedrich LLP

(57) ABSTRACT

A power tool, such as a band saw, is provided and may include a housing having a first handle and a second handle, a motor, a first wheel, a second wheel and a battery supported by the housing and electrically connectable to the motor for powering the motor, the battery is at least partially positioned at least one of between the first handle and the second handle and between a first wheel axis of the first wheel and a second wheel axis of the second wheel. In some aspects, a power tool may include a battery support for supporting a battery, the battery support being formed separately from a housing of the band saw and being supportable by the housing. In other aspects, a band saw may be operable with at least a 26 Volt battery.

13 Claims, 33 Drawing Sheets

U.S. PATENT DOCUMENTS

| | | | |
|---|---|---|---|
| 4,001,937 A | 1/1977 | Stelljes et al. | |
| 4,084,123 A | 4/1978 | Lineback et al. | |
| D248,085 S | 6/1978 | Stelljes et al. | |
| 4,141,142 A | 2/1979 | Karubian | |
| 4,242,798 A | 1/1981 | Wikoff | |
| 4,257,297 A | 3/1981 | Nidbella | |
| 4,406,064 A | 9/1983 | Goss | |
| 4,413,414 A * | 11/1983 | Strzalka | 30/380 |
| 4,502,184 A | 3/1985 | Karubian | |
| 4,622,749 A | 11/1986 | Inagaki | |
| 4,787,145 A | 11/1988 | Klicker et al. | |
| 4,823,666 A | 4/1989 | Galloway | |
| 4,833,782 A | 5/1989 | Smith | |
| 4,847,513 A | 7/1989 | Katz et al. | |
| D306,126 S | 2/1990 | Arehart et al. | |
| 4,949,464 A | 8/1990 | Adomatis | |
| 5,038,481 A | 8/1991 | Smith | |
| 5,089,738 A | 2/1992 | Bergqvist et al. | |
| 5,207,697 A | 5/1993 | Carusillo et al. | |
| 5,272,813 A | 12/1993 | Wolf et al. | |
| 5,285,708 A | 2/1994 | Bosten et al. | |
| 5,287,786 A | 2/1994 | Fiala | |
| 5,363,558 A | 11/1994 | Schroeder | |
| 5,375,495 A | 12/1994 | Bosten et al. | |
| 5,388,334 A | 2/1995 | Halsey | |
| 5,509,206 A | 4/1996 | Rowe et al. | |
| 5,533,843 A | 7/1996 | Chung | |
| 5,561,909 A | 10/1996 | Berg et al. | |
| 5,630,277 A | 5/1997 | Kimura | |
| 5,725,530 A * | 3/1998 | Popken | 606/82 |
| 5,850,698 A | 12/1998 | Hurn et al. | |
| D408,246 S | 4/1999 | Juratovac et al. | |
| D408,248 S | 4/1999 | Zurwelle et al. | |
| 5,992,025 A | 11/1999 | Fricke | |
| 5,996,460 A | 12/1999 | Waite | |
| 6,026,576 A | 2/2000 | Hurn et al. | |
| 6,206,538 B1 | 3/2001 | Lemoine | |
| 6,256,891 B1 | 7/2001 | Van Camp et al. | |
| 6,318,874 B1 | 11/2001 | Matsunaga | |
| 6,376,942 B1 | 4/2002 | Burger et al. | |
| 6,397,717 B1 | 6/2002 | Waite | |
| 6,401,346 B1 | 6/2002 | Roberts | |
| 6,430,813 B2 * | 8/2002 | Muraguchi et al. | 30/43.92 |
| 6,442,848 B1 | 9/2002 | Dean | |
| 6,470,576 B2 | 10/2002 | Watson | |
| D467,256 S | 12/2002 | Chunn et al. | |
| 6,494,590 B1 | 12/2002 | Paganini et al. | |
| 6,575,590 B1 | 6/2003 | Wadsworth | |
| 6,578,459 B2 | 6/2003 | Waite | |
| 6,637,117 B2 | 10/2003 | Kobayashi | |
| 6,736,037 B2 * | 5/2004 | Dean | 83/13 |
| 6,829,830 B2 * | 12/2004 | O'Banion | 30/371 |
| 6,960,894 B2 * | 11/2005 | Carusillo et al. | 318/400.01 |
| 6,996,909 B1 * | 2/2006 | Buck et al. | 30/388 |
| 2001/0029819 A1 | 10/2001 | Okouchi | |
| 2002/0089306 A1 * | 7/2002 | Kubale et al. | 320/112 |
| 2002/0170400 A1 * | 11/2002 | Gass | 83/62.1 |
| 2003/0094081 A1 * | 5/2003 | Becker et al. | 81/479 |
| 2003/0102844 A1 * | 6/2003 | Bailey | 320/114 |
| 2003/0188440 A1 | 10/2003 | Dean | |
| 2004/0020061 A1 | 2/2004 | O'Banion | |
| 2004/0049926 A1 | 3/2004 | Miklosz et al. | |
| 2004/0049927 A1 | 3/2004 | Wu | |
| 2004/0148786 A1 * | 8/2004 | Achterberg et al. | 30/298.4 |
| 2004/0158996 A1 * | 8/2004 | McIntosh | 30/380 |
| 2005/0262984 A1 * | 12/2005 | Hetcher et al. | 83/471.3 |

FOREIGN PATENT DOCUMENTS

| | | |
|---|---|---|
| EP | 1281486 A1 | 5/2003 |
| EP | 0979711 A3 | 12/2003 |
| EP | 1481769 A1 | 1/2004 |
| GB | 711331 | 6/1954 |
| JP | 7185933 | 7/1995 |
| JP | 2000042949 A | 7/1998 |
| JP | 2000042949 | 2/2000 |
| JP | 2001300819 | 10/2001 |
| JP | 2003094401 | 4/2003 |
| JP | 2003-220579 | 8/2003 |

* cited by examiner

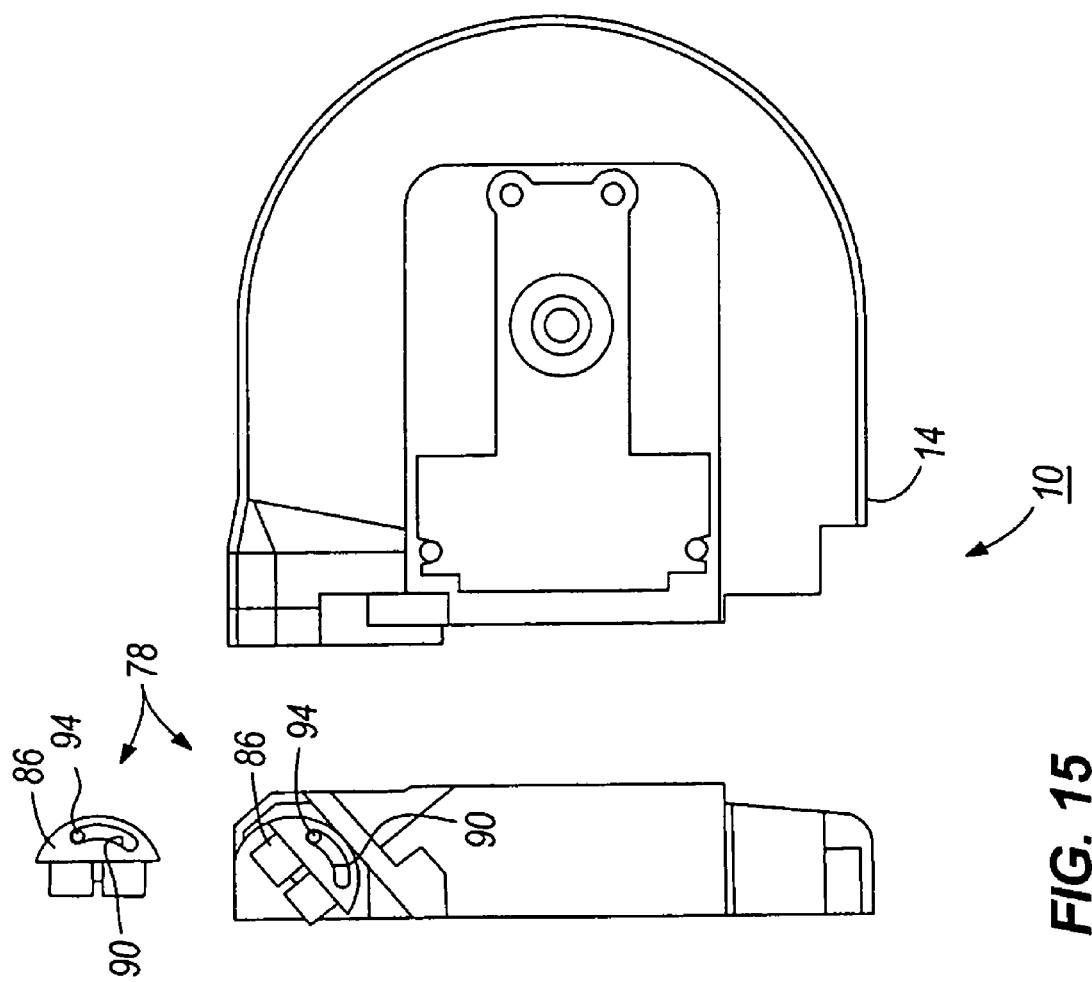
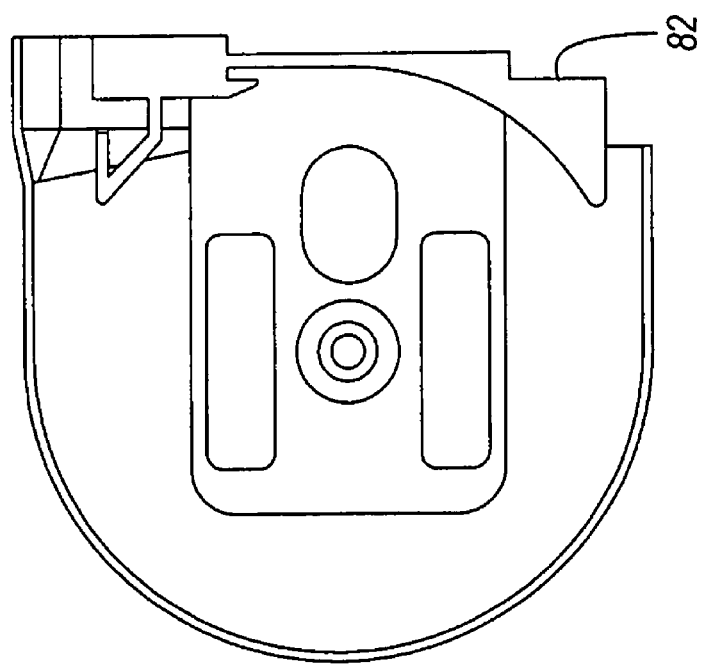
FIG. 15

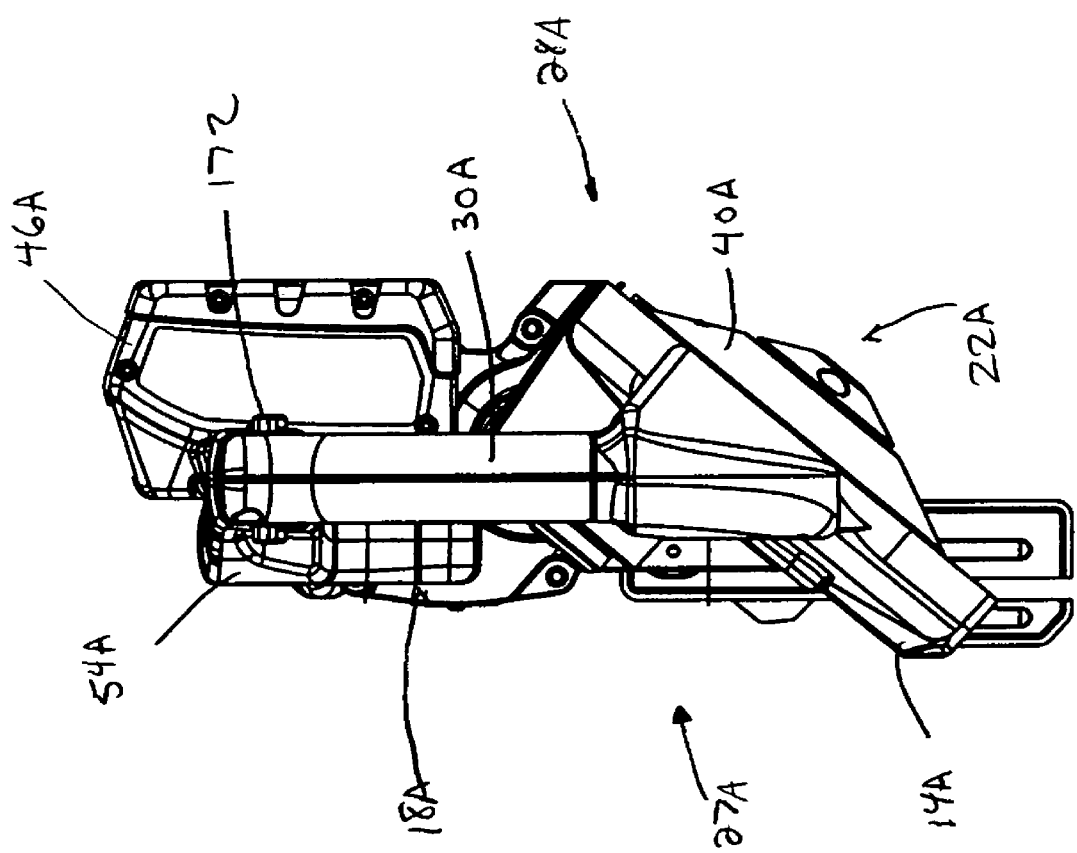

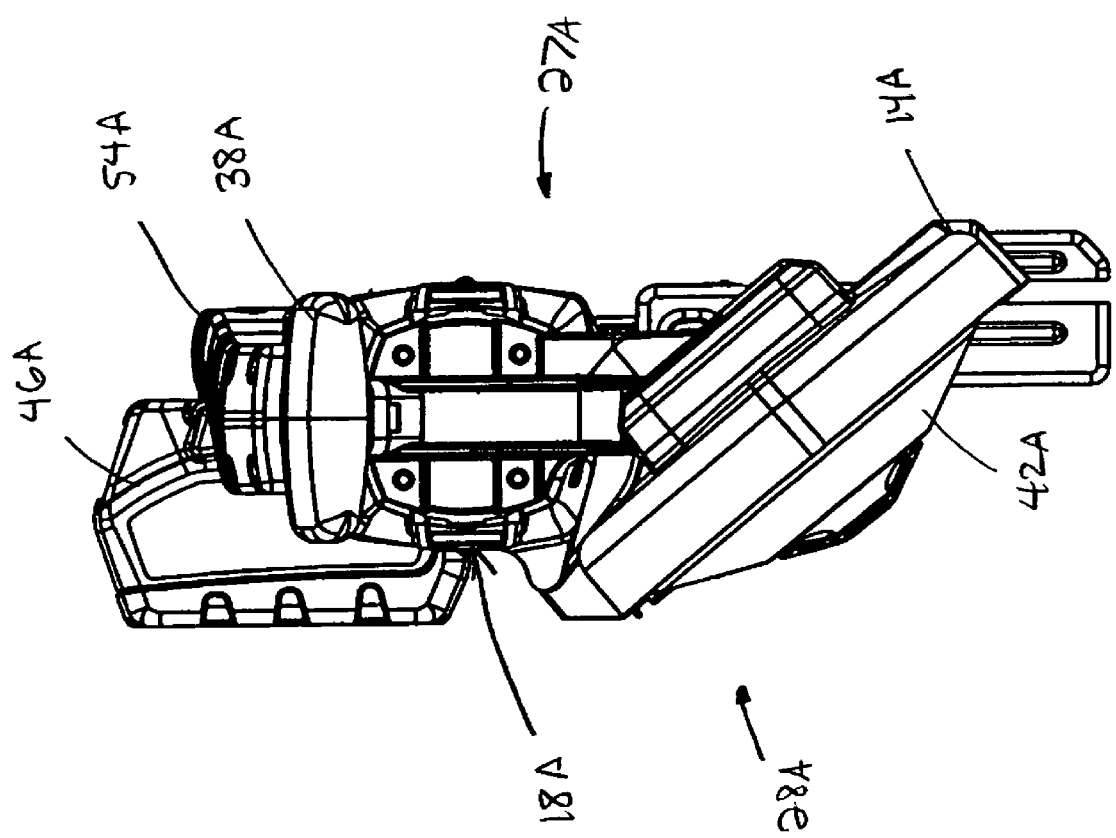

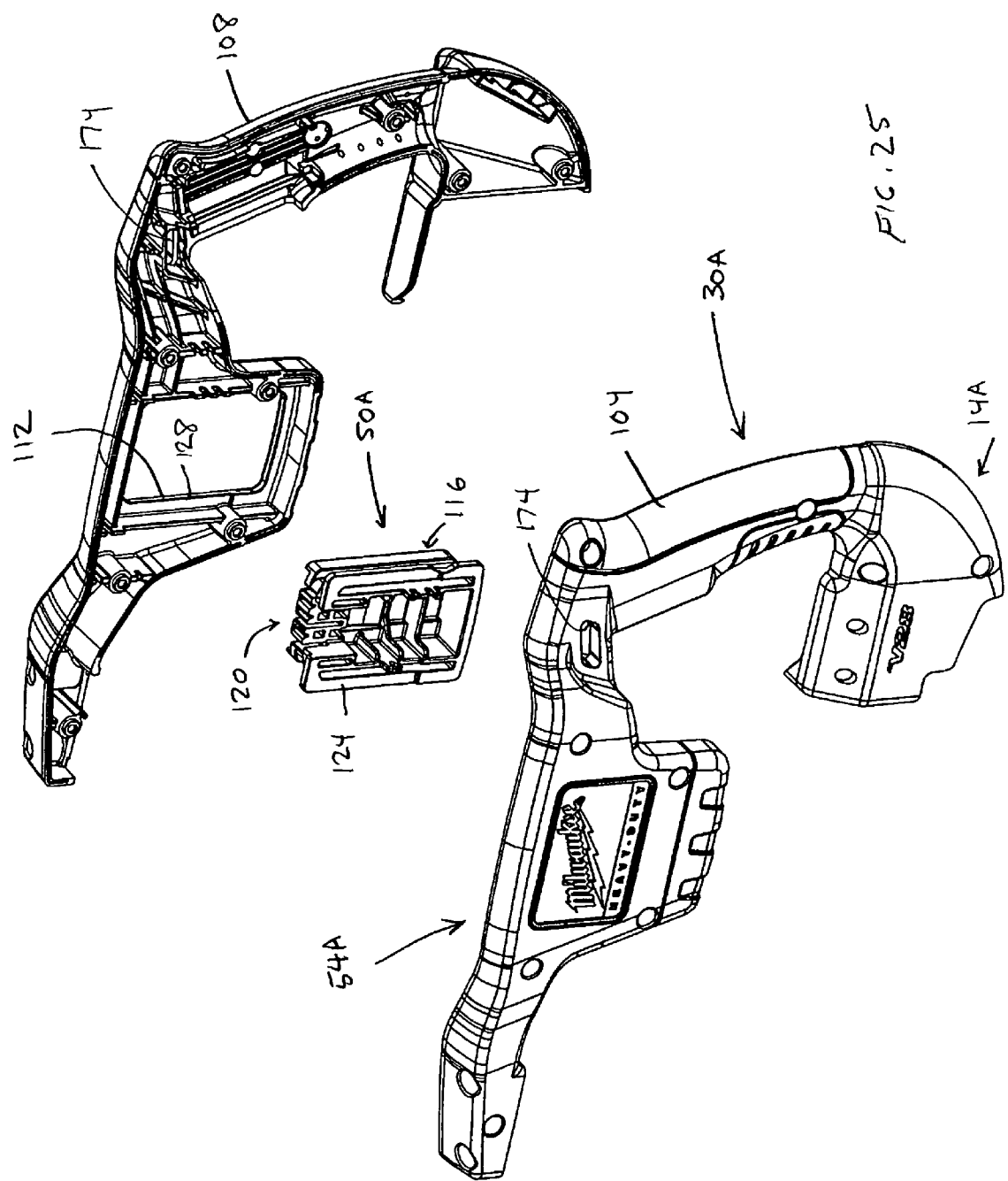

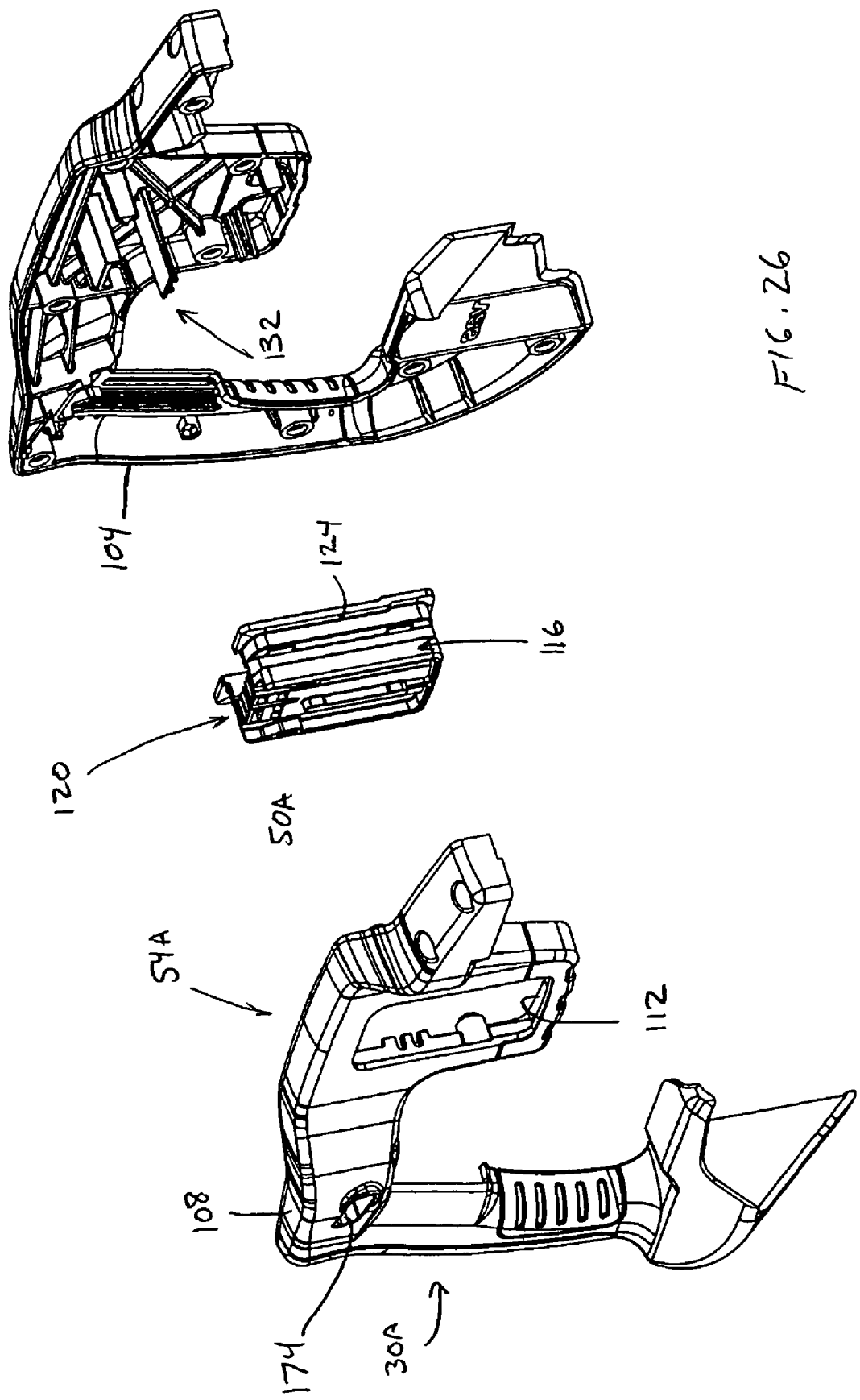

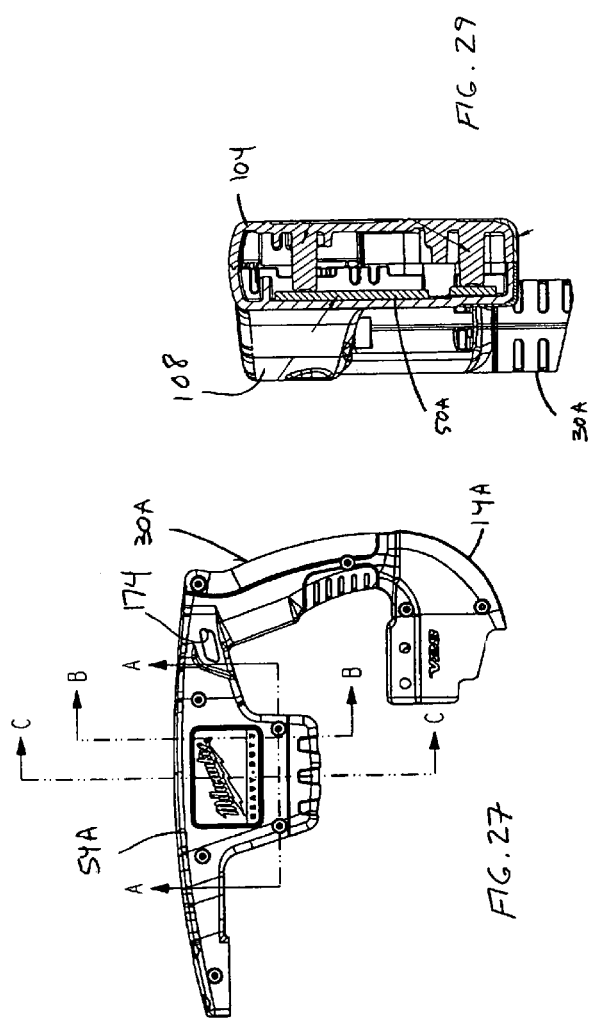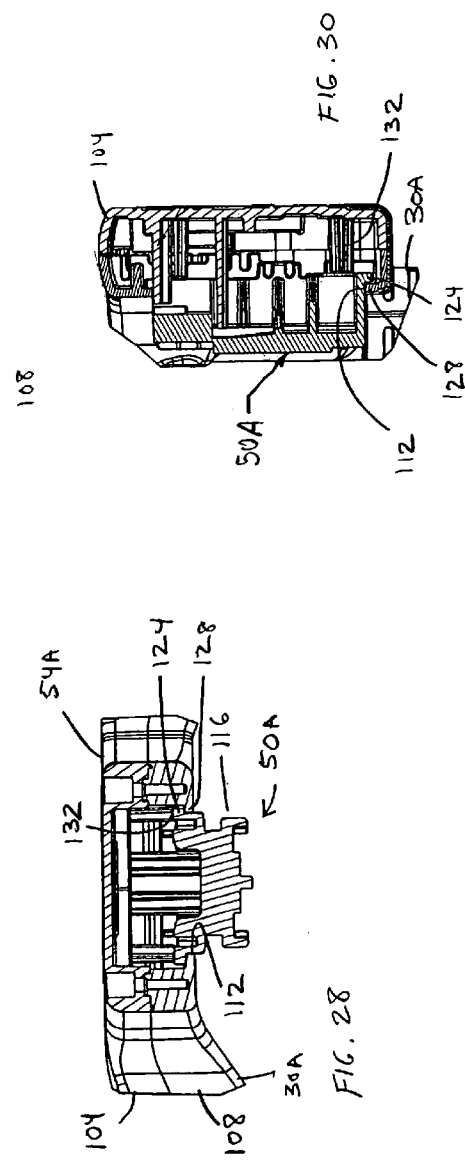

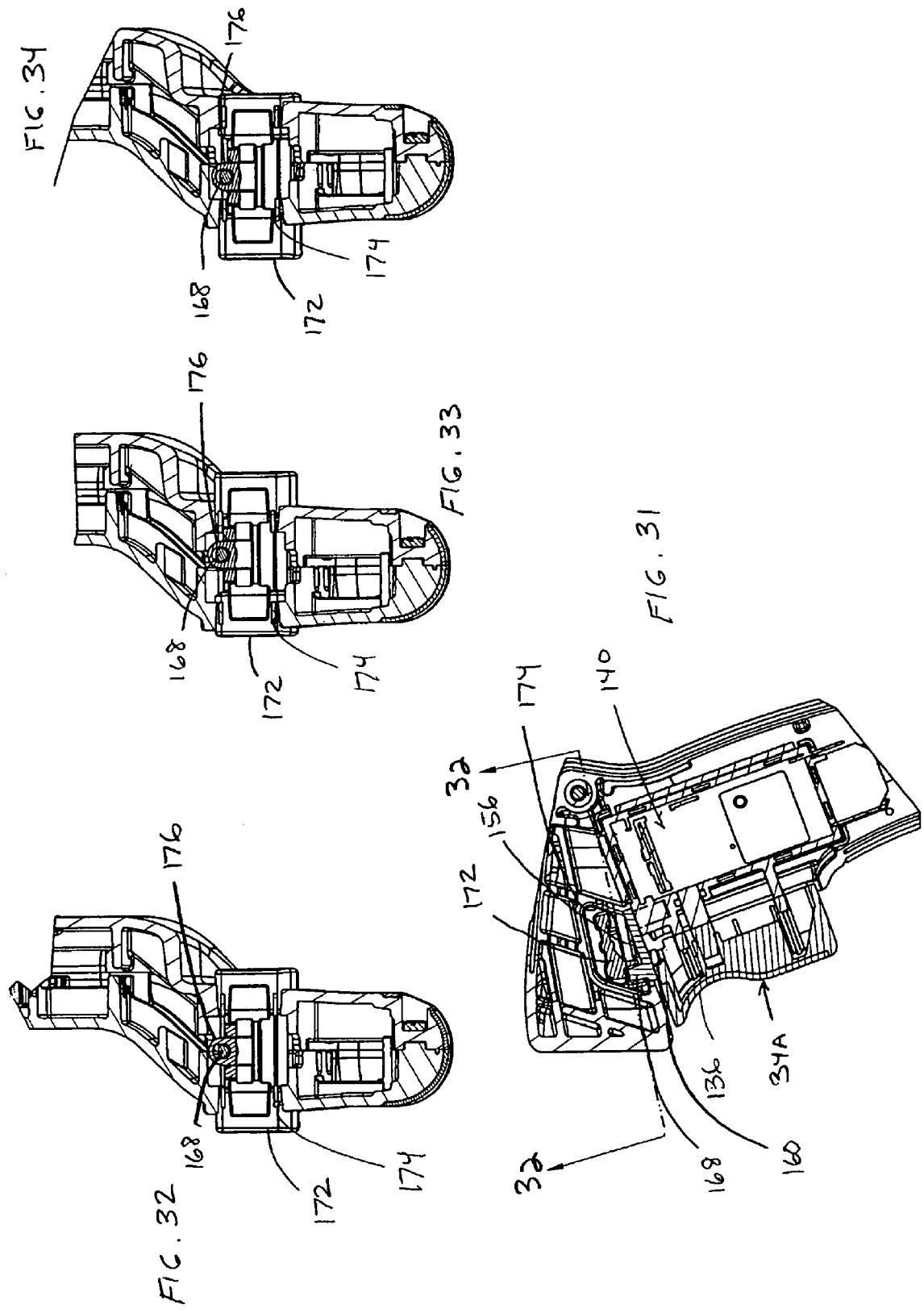

BAND SAW

RELATED APPLICATIONS

The present application claims the benefit of prior-filed, co-pending U.S. Provisional Patent Application Ser. Nos. 60/546,489, filed Feb. 20, 2004, and 60/623,422, filed Oct. 28, 2004, the entire contents of both are hereby incorporated by reference.

FIELD OF THE INVENTION

The present invention relates to power tools and, more particularly, to band saws.

SUMMARY OF THE INVENTION

In some aspects and in some constructions, the band saw may be battery-powered.

In some aspects and in some constructions, the band saw may generally include an illumination device, such as, for example, an LED, to illuminate the saw blade, the work piece and/or the work area.

In some aspects and in some constructions, the band saw may generally include a hook or support for supporting the band saw when not in use.

In some aspects and in some constructions, the band saw may generally include a belt and pulley drive system to drive the saw blade instead of the typical chain and sprocket drive assembly.

In some aspects and in some constructions, the band saw may generally include a mechanism to pivot or adjust the plane of the band saw blade to perform cuts at varying angles.

In some aspects and in some constructions, the band saw may generally include a mechanism to adjust the distance between the pulleys between a first length, to accommodate a band saw blade having a first length, and a second position, to accommodate a band saw blade having a second length which is different than the first length.

In some constructions and in some aspects, the band saw may generally include a motor which is operated at multiple operator-selected speeds and a selector mechanism for selecting at least two defined motor speeds.

In some constructions and in some aspects, the band saw may generally include a housing including a first handle and a second handle spaced from the first handle, a motor supported by the housing, a first wheel supported by the housing for rotation about a first wheel axis, the first wheel being coupled to the motor and driveable by the motor, a second wheel supported by the housing for rotation about a second wheel axis, a band saw blade extending around the first wheel and the second wheel and traveling in a continuous loop around the first wheel and the second wheel to cut a work piece, and a battery supported by the housing and electrically connectable to the motor for powering the motor, the battery being at least partially positioned at least one of between the first handle and the second handle and between the first wheel axis and the second wheel axis.

In some constructions and in some aspects, a power tool may generally include a housing, a motor supported by the housing and operable to drive a tool element, a battery electrically connectable to the motor and operable to provide power to the motor, and a battery support for supporting the battery, the battery support being formed separately from the housing and being supportable by the housing.

In some constructions and in some aspects, the band saw may generally include a housing, a motor supported by the housing and defining a motor axis, a band saw blade being driven by the motor to cut a work piece, the blade defining a cutting plane, the motor axis being in a motor axis plane parallel to the cutting plane, and a battery supported by the housing and electrically connectable to the motor for powering the motor, at least a substantial portion of the battery being positioned on a side of the motor axis plane opposite to the cutting plane.

In some constructions and in some aspects, the band saw may generally include a housing, a motor supported by the housing for driving a band saw blade, and a battery supported by the housing and electrically connectable to the motor for powering the motor, the battery being at least 26 Volts.

Independent features and independent advantages of the present invention will become apparent to those skilled in the art upon review of the following detailed description and drawings.

BRIEF DESCRIPTION OF THE DRAWINGS

FIG. 15 includes views of a portion of another alternative construction of a band saw, shown with a drive wheel and an idler wheel removed.

FIG. 23 is a rear view of the band saw shown in FIG. 17.

FIG. 24 is a front view of the band saw shown in FIG. 17.

FIG. 25 is an exploded perspective view of a portion of the band saw shown in FIG. 17.

FIG. 26 is another exploded perspective view of the portion of the band saw shown in FIG. 25.

FIG. 27 is a side view of the portion of the band saw shown in FIG. 25.

FIG. 28 is a cross-sectional view taken generally along line A-A in FIG. 27.

FIG. 29 is a cross-sectional view taken generally along line B-B in FIG. 27.

FIG. 30 is a cross-sectional view taken generally along line C-C in FIG. 27.

FIG. 31 is a cross-sectional view of a portion of the band saw shown in FIG. 17.

FIG. 32 is a top cross-sectional view taken generally along line 32-32 in FIG. 31 and illustrating a center or lock position of a shuttle switch.

FIG. 33 is a top cross-sectional view of the portion of the band saw shown in FIG. 32 and illustrating the shuttle switch in a first or low speed position.

FIG. 34 is a top cross-sectional view of the portion of the band saw shown in FIG. 32 and illustrating the shuttle switch in a second or high speed position.

Figure 1:
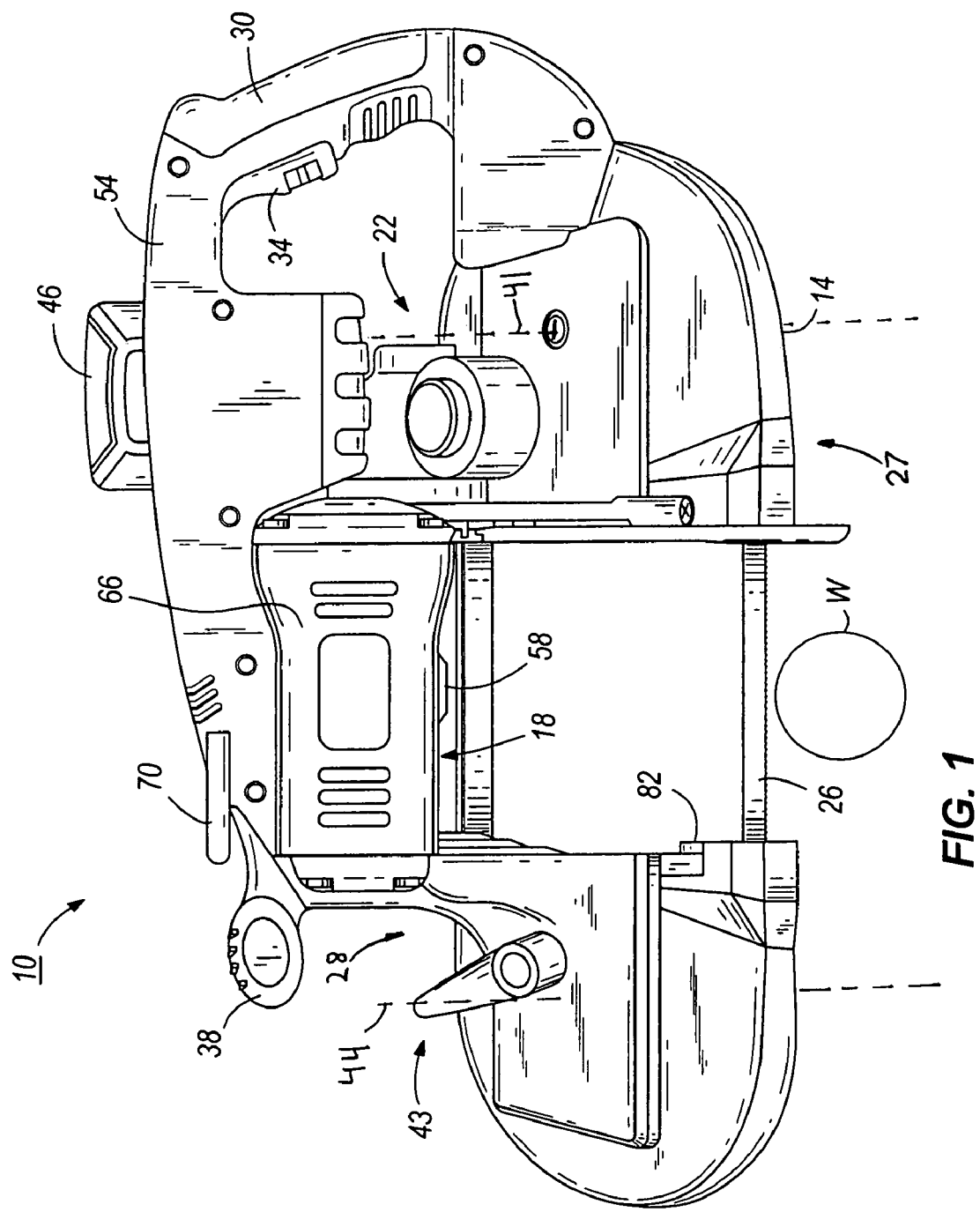
FIG. 1 is a side view of a band saw.
Figure 2:
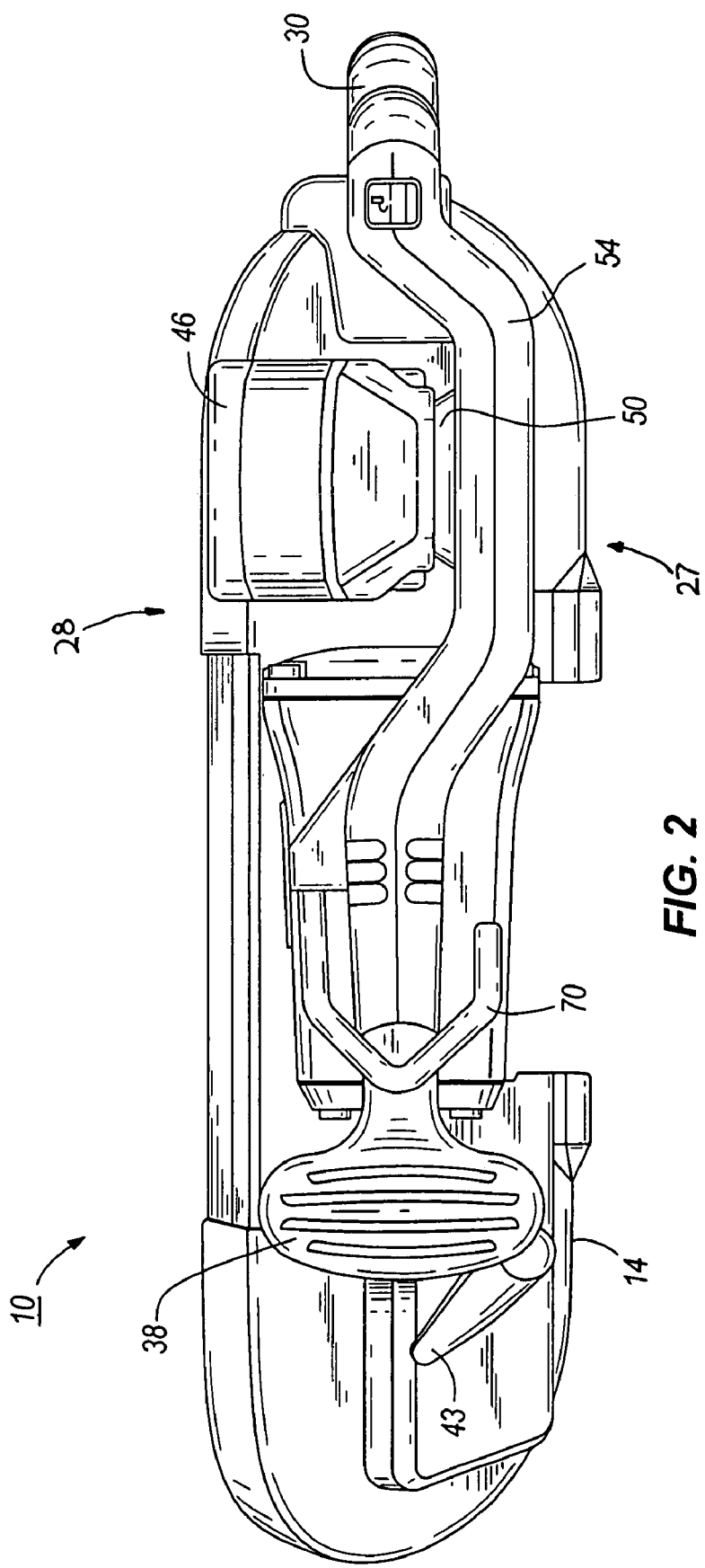
FIG. 2 is a top view of the band saw shown in FIG. 1.
Figure 3:
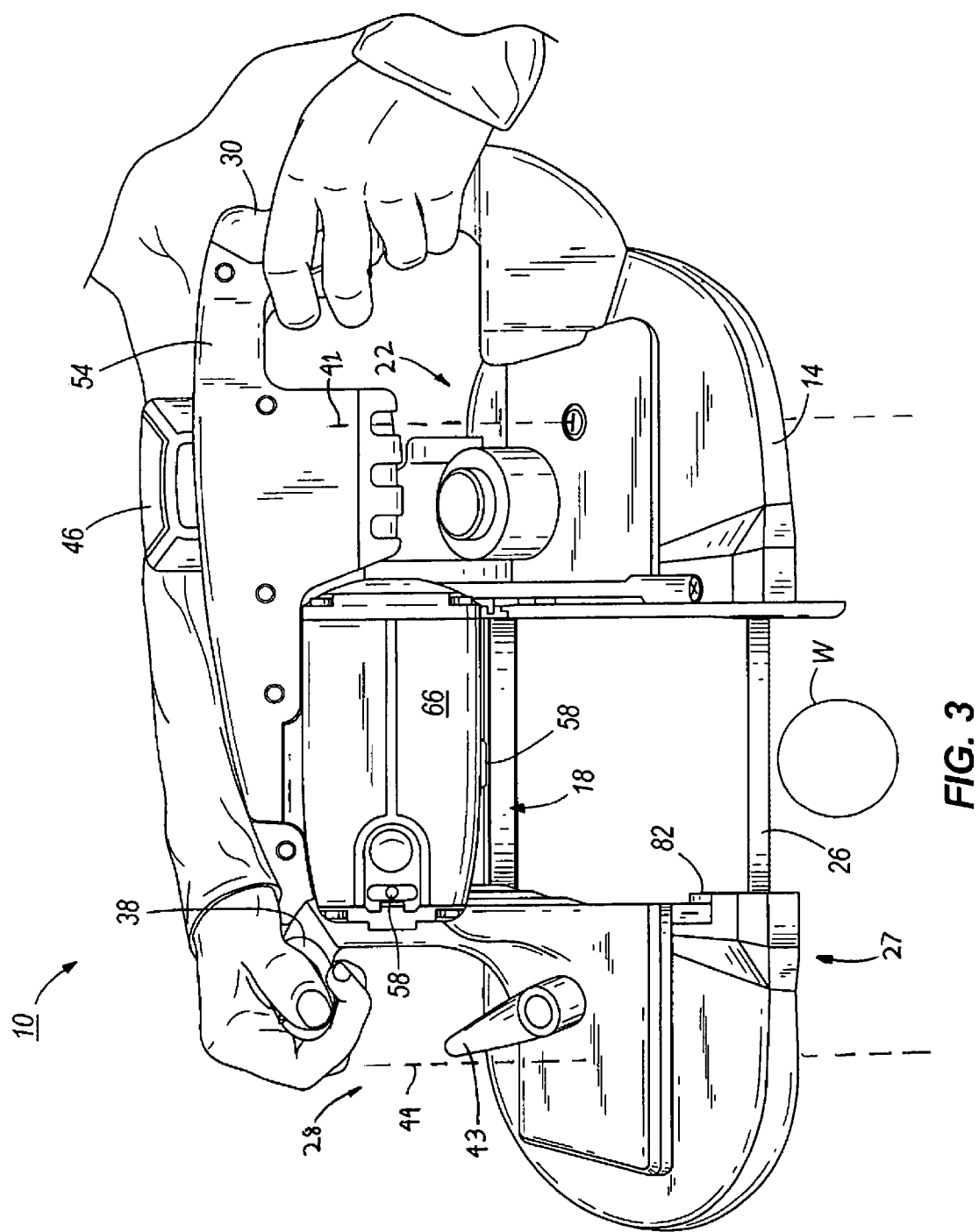
FIG. 3 is a side view of an alternative construction of a band saw.
Figure 4:
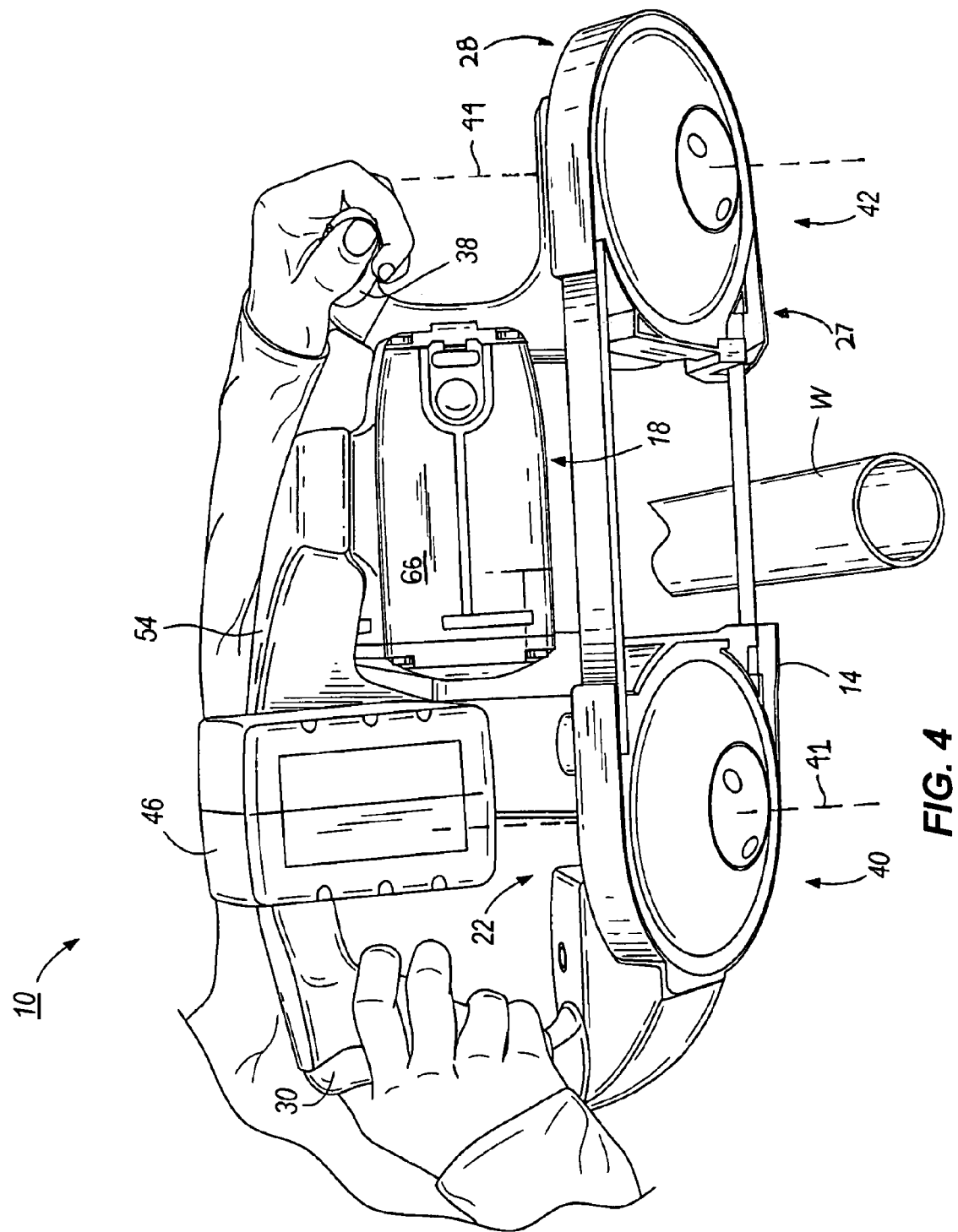
FIG. 4 is a side view of the band saw in the position shown in FIG. 3.
Figure 5:
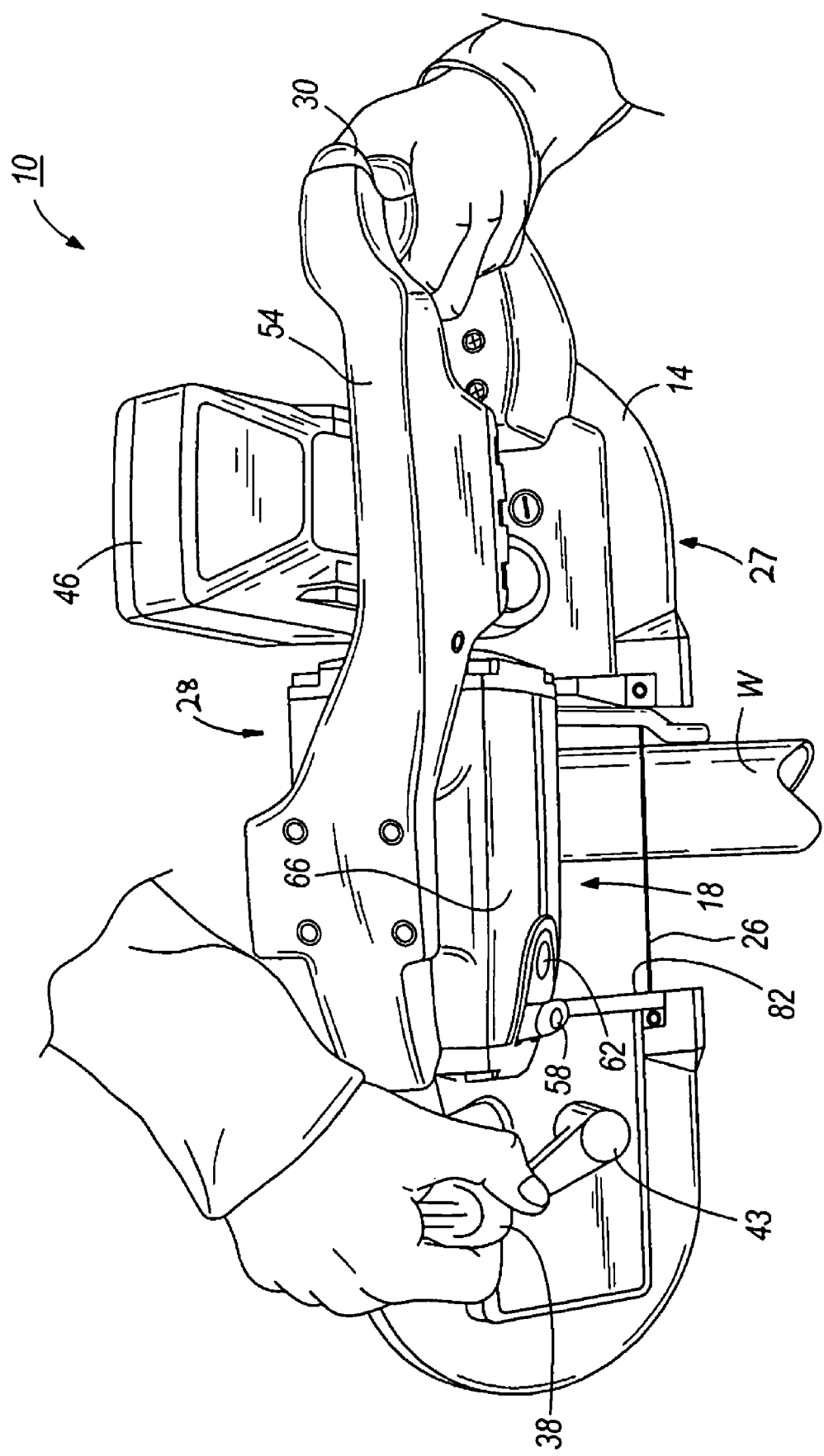
FIG. 5 is a top view of the band saw in the position shown in FIG. 3.
Figure 6:
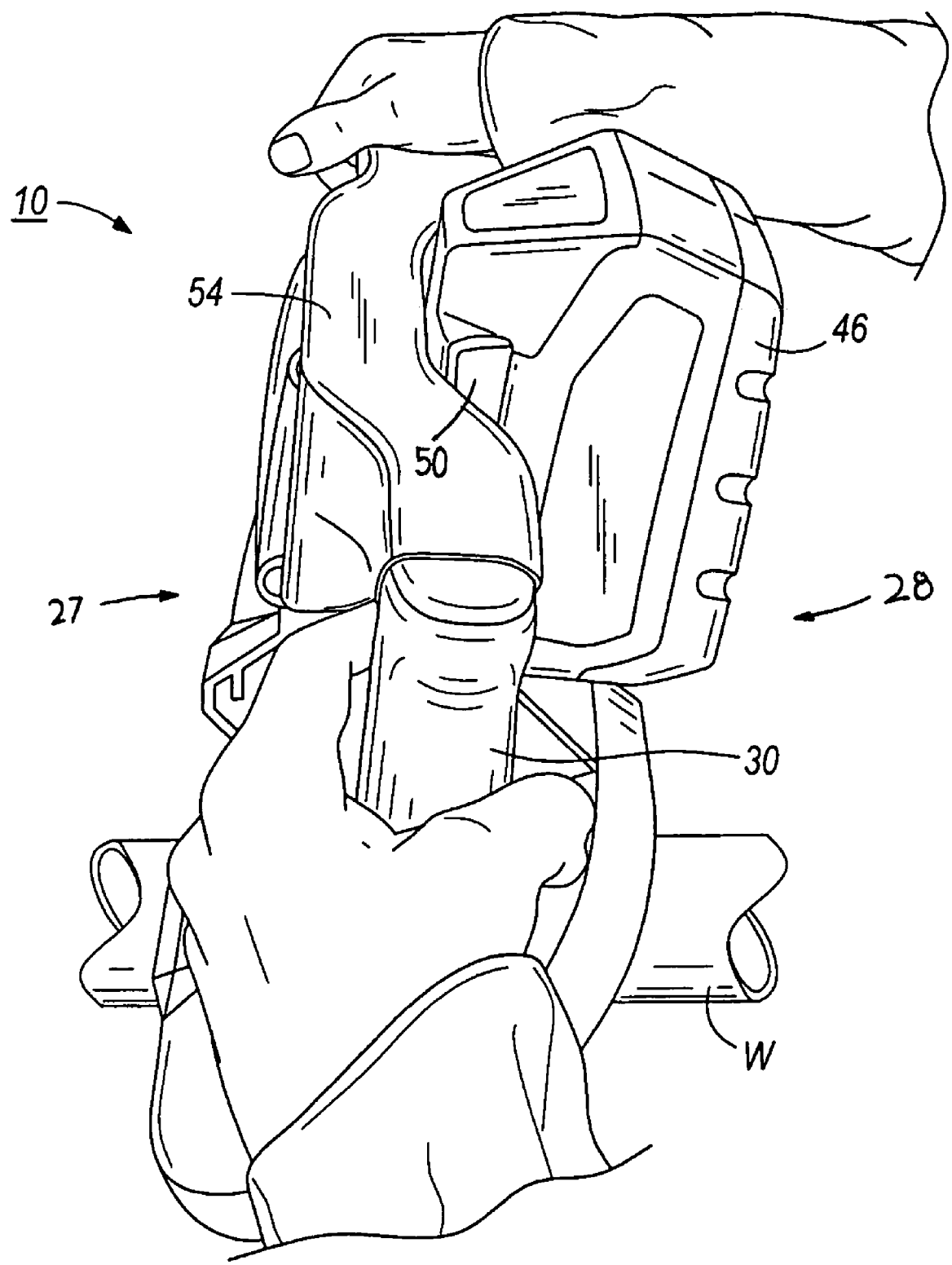
FIG. 6 is a rear view of the band saw in the position shown in FIG. 3.
Figure 7:
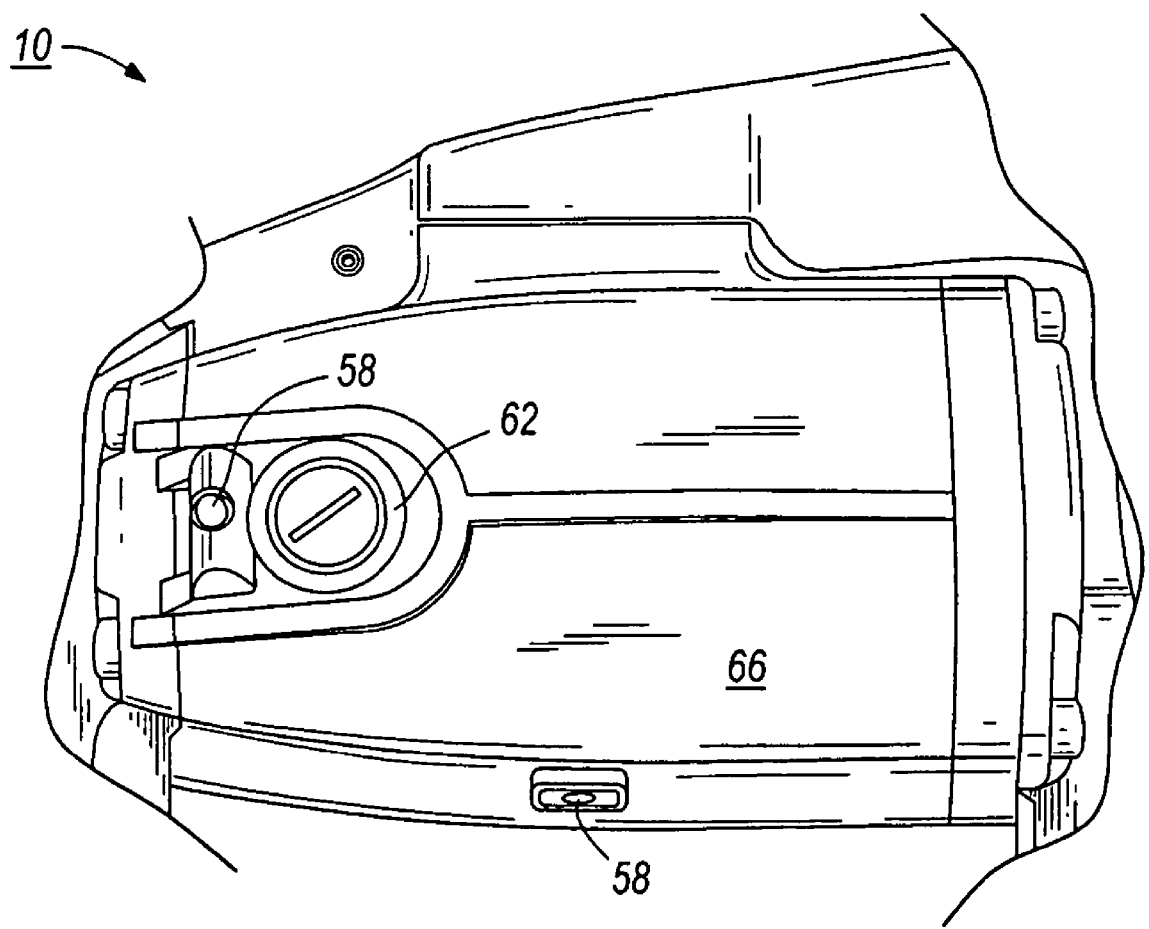
FIG. 7 is a close-up side view of a portion of the band saw shown in FIG. 3 and illustrating an illumination device.
Figure 8:
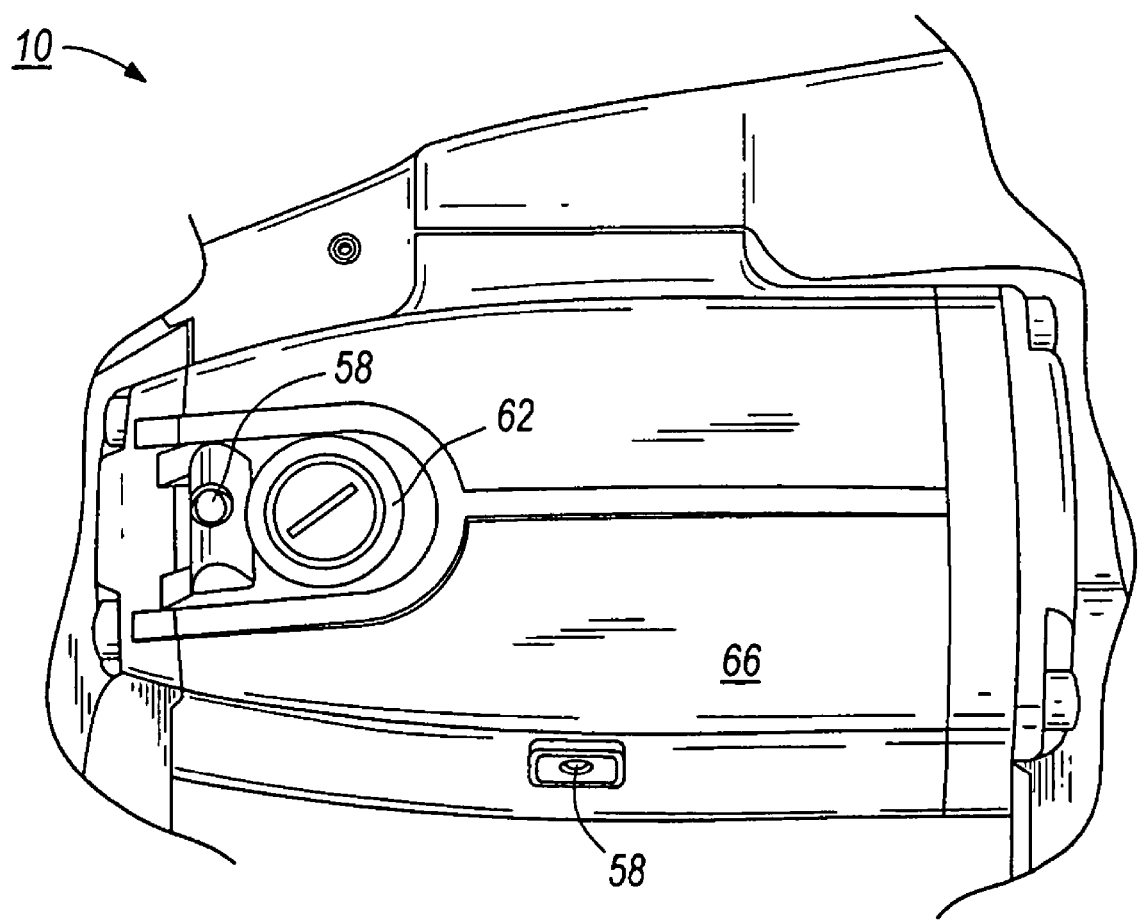
FIG. 8 is another close-up bottom view of the portion of the band saw shown in FIG. 7.

Before at least one embodiment of the invention is explained in detail, it is to be understood that the invention is not limited in its application to the details of the constructions and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items.

DETAILED DESCRIPTION

FIGS. 1-8 illustrate constructions of a band saw 10 embodying some aspects of the invention. The band saw 10 generally includes a housing or frame 14 supporting a motor 18. The motor 18 is drivingly connected to a drive assembly 22, and the motor 18 and the drive assembly 22 are operable to drive a continuous band saw blade 26 to cut a work piece W. As described herein, the band saw 10 includes a front 27 and a rear 28. The front 27 is defined as the side being proximate the portion of the band saw blade 26 that cuts the work piece W and the back 28 is defined as the side proximate the portion of the band saw blade 26 that does not cut the work piece W. The back 28 otherwise described as being opposite the front 27.

The housing 14 includes a main handle 30 supporting an On/Off switch assembly 34. The switch assembly 34 is operable to control operation of the motor 18. The band saw 10 also includes an auxiliary handle 38 for an operator's other hand. Generally, the handles 30 and 38 are shaped and arranged for two-handed operation of the band saw 10 as a work piece is cut (see FIGS. 3-6). In the illustrated construction, each handle 30 and 38 has ergonomic design to provide comfortable gripping and controlled operation of the band saw 10. The ergonomic design of each handle 30 and 38 and of the combination of the handles 30 and 38 may include the orientation or angle of handle(s) 30 and/or 38. The ergonomic design may also include the use of material, such as an elastomeric material, on the handle(s) 30 and/or 38 to, one or more of, provide an improved grip surface, isolate vibration and impacts from the operator, prevent heat-build-up and/or transfer to the operator, etc.

The drive mechanism 22 generally includes (see FIG. 4) a drive wheel 40 rotating about a drive wheel axis 41 and drivingly connected to the motor 18, and an idler wheel 42 rotating about an idler wheel axis 44 and rotatably supported by the housing 14. The band saw blade 26 extends around the drive wheel 40 and the idler wheel 42. The band saw 10 may also include a blade tensioning mechanism 43 to adjustably provide appropriate tension on the band saw blade 26.

As shown in FIGS. 1-6, in some aspects and in the illustrated construction, the band saw 10 may be battery-powered. In such constructions, the band saw 10 is operable with a battery 46 which selectively powers the motor 18. In the illustrated construction, the battery 46 is a rechargeable, removable power tool battery. In the illustrated construction, the battery 46 has a nominal voltage of at least 26 V to provide sufficient power to the motor 18 for cutting metal, wood, etc. It should be understood that, in other constructions, the battery 46 may have a lower nominal voltage (e.g., 12 V, 18 V, 24 V, etc.) or a higher nominal voltage (e.g., 28 V, 40 V, etc.) as required by the performance requirements of the band saw 10.

The housing 14 provides a battery support portion 50 for physically supporting the battery 46 on the housing 14. The battery support portion 50 also includes a terminal assembly portion (not shown) for electrically connecting the battery 46 to the motor 18 via an electrical circuit (not shown).

The battery 46 and the battery support portion 50 may be similar to those described in co-pending U.S. patent application Ser. No. 10/720,027, filed Nov. 20, 2003, entitled METHOD AND SYSTEM FOR BATTERY PROTECTION, and in co-pending U.S. patent application Ser. No. 10/721,800, filed Nov. 24, 2003, entitled BATTERY PACK, the contents of both of which are hereby incorporated by reference. The battery 46 and the battery support portion 50 may also be similar to those described in co-pending U.S. Provisional Patent Application Ser. Nos. 60/574,278, filed May 24, 2004, 60/612,352, filed Sep. 22, 2004, 60/626,013, filed Nov. 5, 2004, 60/643,396, filed Jan. 12, 2005, 60/582,138, filed Jun. 23, 2004, 60/582,728, filed Jun. 24, 2004, 60/582,730, filed Jun. 24, 2004, and 60/626,230, filed Nov. 9, 2004, the contents of all of which are hereby incorporated by reference.

In the band saw 10, the battery 46 is generally positioned to consider at least one of the following: line of sight of the band saw blade 26 and work piece W; balance and/or center of gravity of the band saw 10; protection of the battery 46 (including from impacts, temperature (ambient and/or resulting from operation of the band saw 10 and/or battery 46), contaminants, etc.); ease of removal and/or replacement of the battery 46; visibility of the battery 46 (e.g., of the battery fuel gauge, if provided); etc.

In the illustrated construction, the battery 46 is positioned on the rearward side of the band saw 10 generally behind the portion 54 of the housing 14 which extends between and connects the handles 30 and 38. In the illustrated construction and in some aspects, to accommodate the battery 46, the housing portion 54 is curved forwardly. This forwardly-curved portion 54 does not interfere with the line of sight of the band saw blade 26 or with operation of the band saw 10. By positioning the battery 46 to the rearward side of the housing 14, the battery 46 also does not interfere with the line of sight of the band saw blade 26 or with operation of the band saw 10 and is not in a region which may be most frequently subject to impacts. The forwardly-curved portion 54 also minimizes the extent to which the battery 46 projects to the rearward side of the housing 14.

The position of the battery 46 and the motor 18 also generally maintains the center of gravity and balance of the band saw 10. In this position of the battery 46, the band saw 10 is operated with a good line of sight and good balance, and the battery 46 is protected and easily removable and/or replaceable.

The location of the battery 46 relative to the band saw 10 also improves the cutting ability of the band saw 10. The weight of the battery 46 is generally located above the location where the band saw blade 26 performs cutting operations on work pieces W (the cutting position). Also, the location of the battery generally positions the center of gravity of the band saw 10 over the cutting position. The added weight from the battery above the cutting position and the center of gravity over the cutting position apply additional downward weight or force on the work piece W, which reduces the amount of downward force required by the user and reduces the time required for each cutting operation. In operation, a user holds the band saw 10 over the work piece W and begins cutting the work piece W. Once cutting begins, the weight of the band saw 10 and the balance of the band saw are such that the band saw 10, under its own weight, is sufficient to complete cutting of the work piece without any additional downward force applied by the user and the band saw only requires a small amount of balancing support by the user to maintain balance during cutting.

Figure 9:
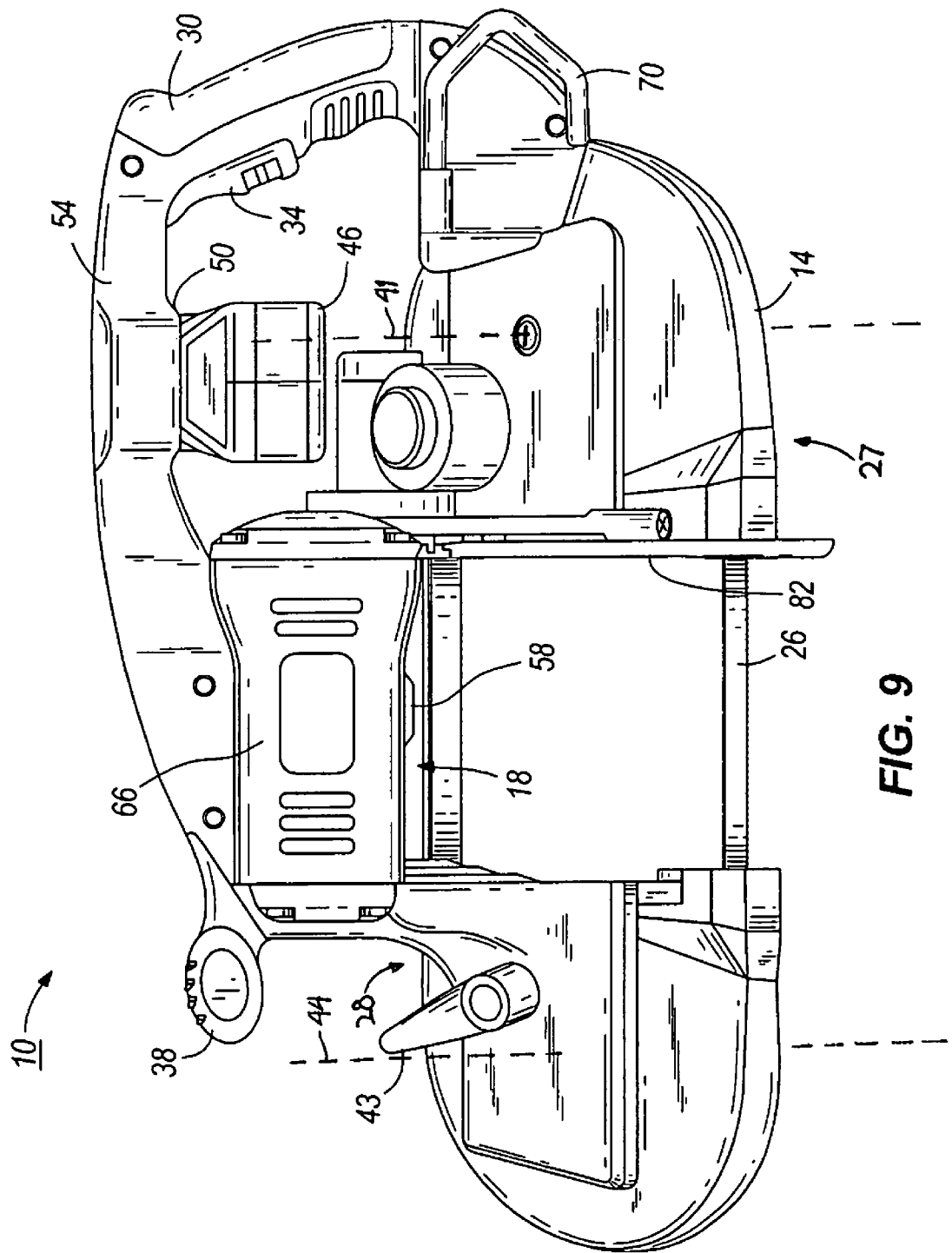
FIG. 9 is a side view of another alternative construction of a band saw.
Figure 10:
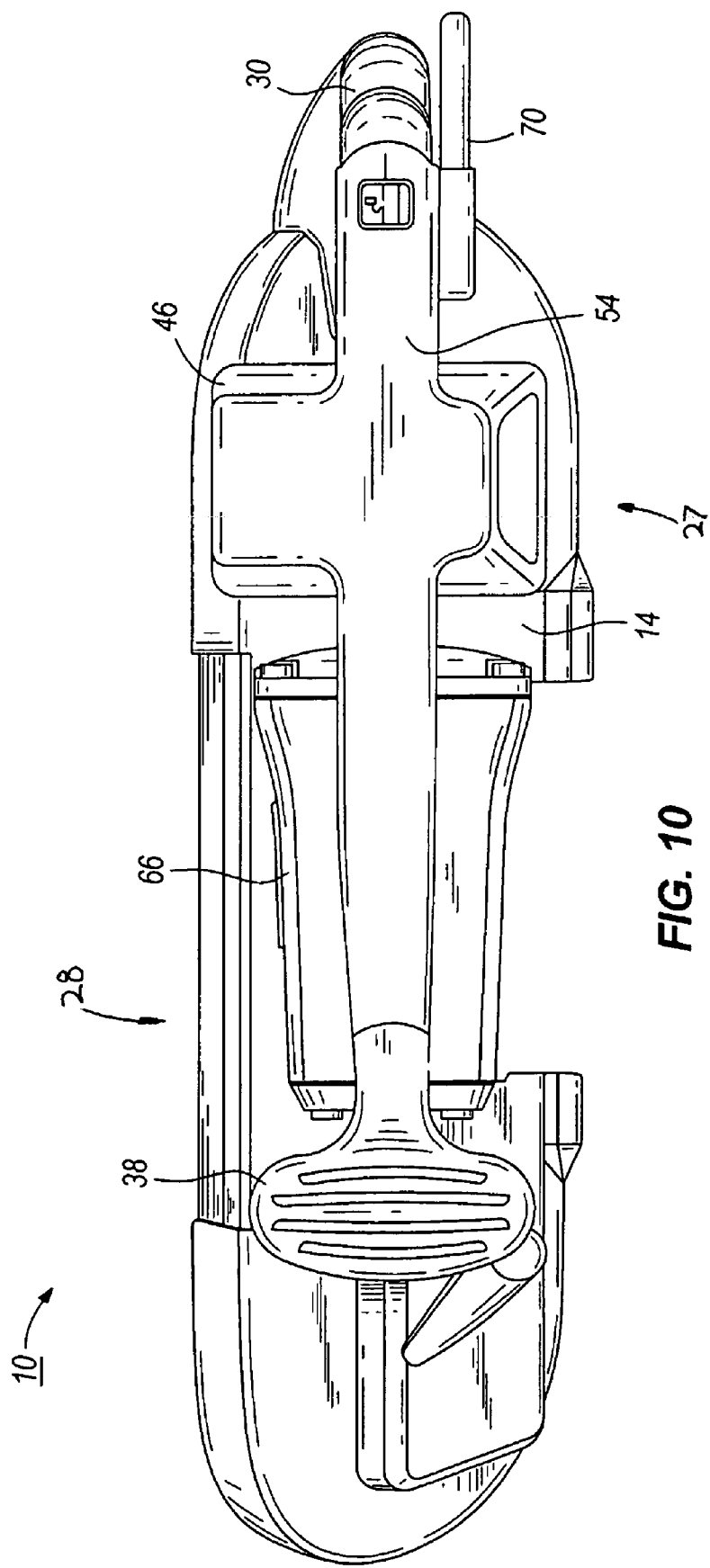
FIG. 10 is a top view of the band saw shown in FIG. 9.
Figure 11:
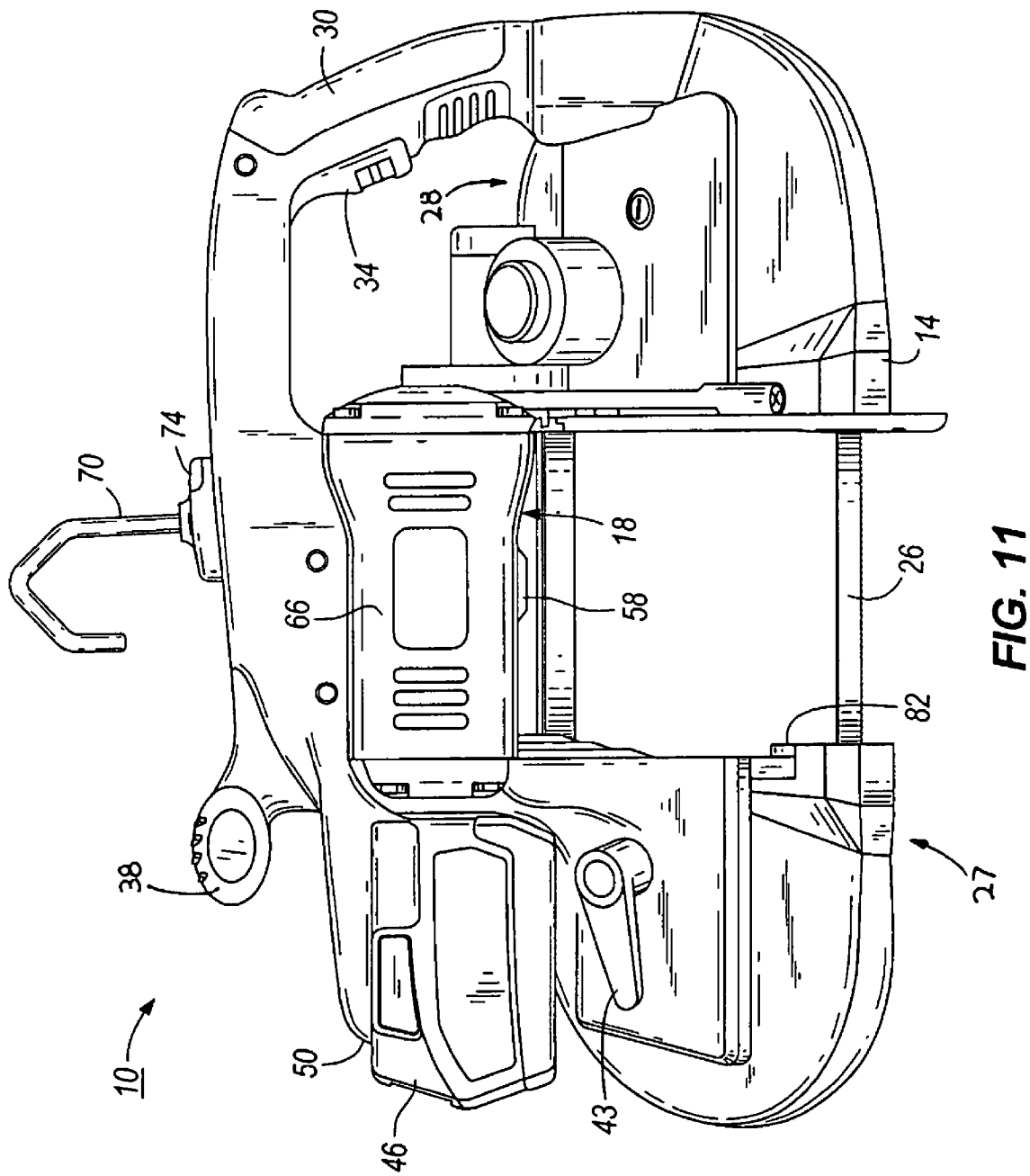
FIG. 11 is a side view of yet another alternative constructions of a band saw.
Figure 12:
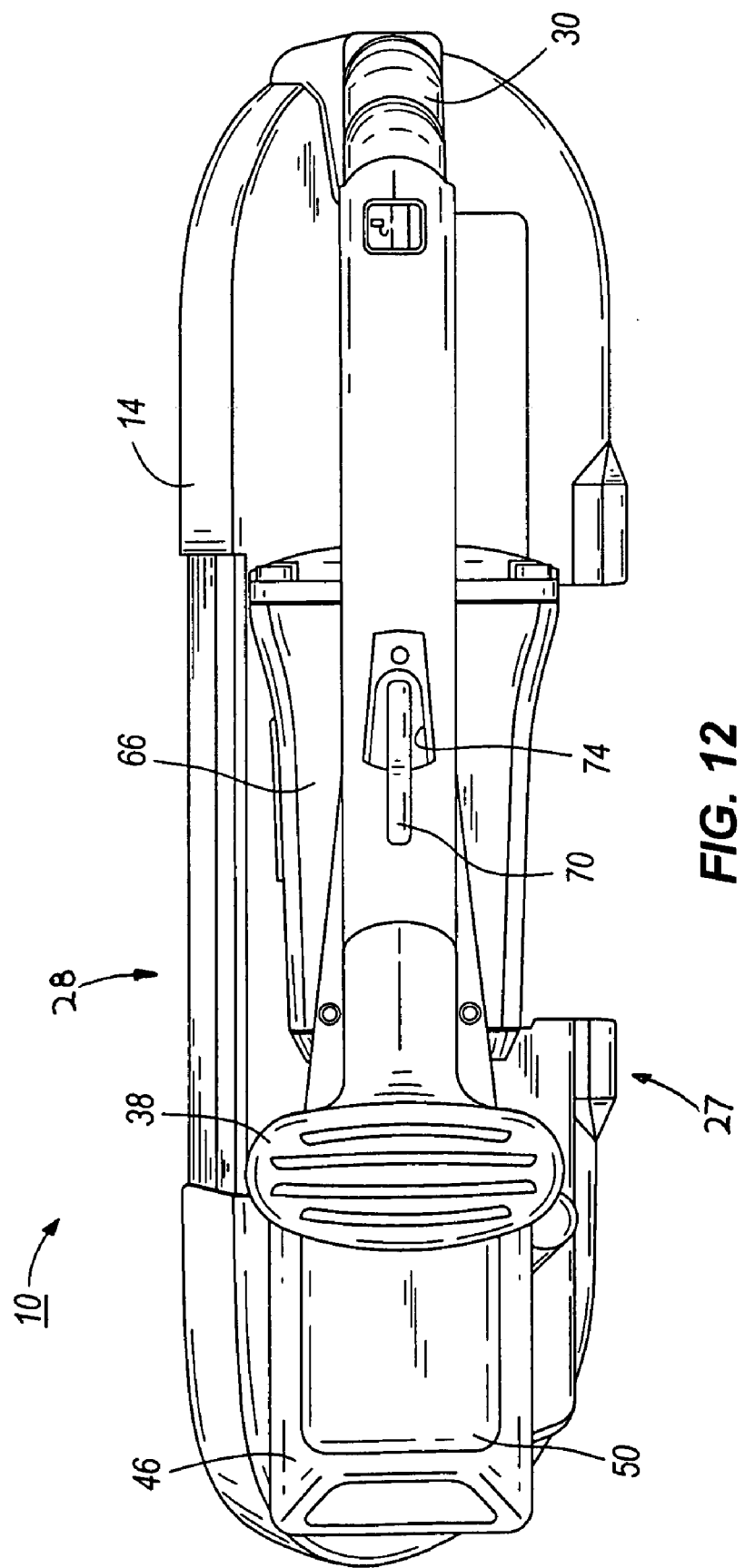
FIG. 12 is a top view of the band saw shown in FIG. 11.
Figure 13:
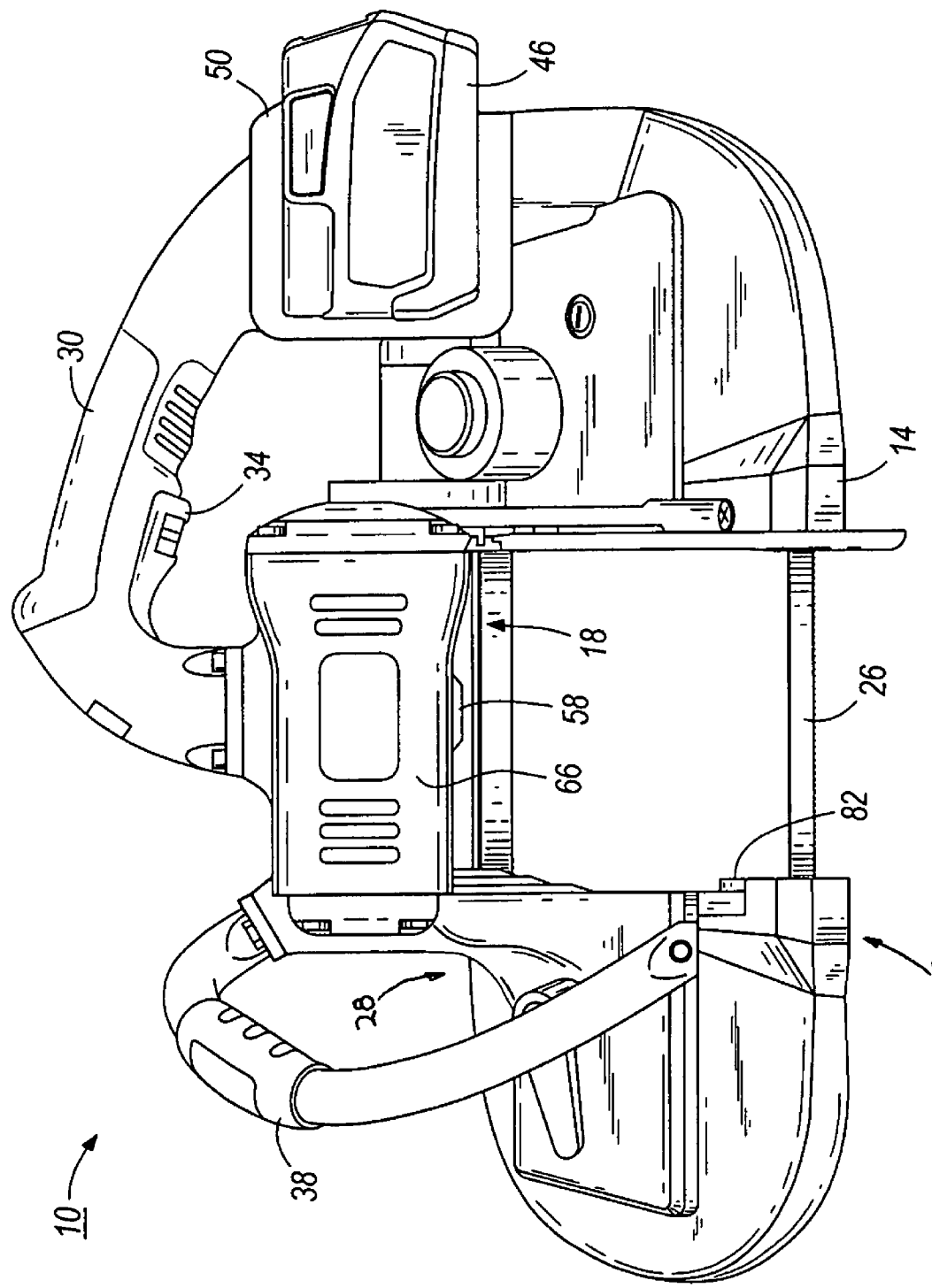
FIG. 13 is a side view of a further alternative constructions of a band saw.
Figure 14:
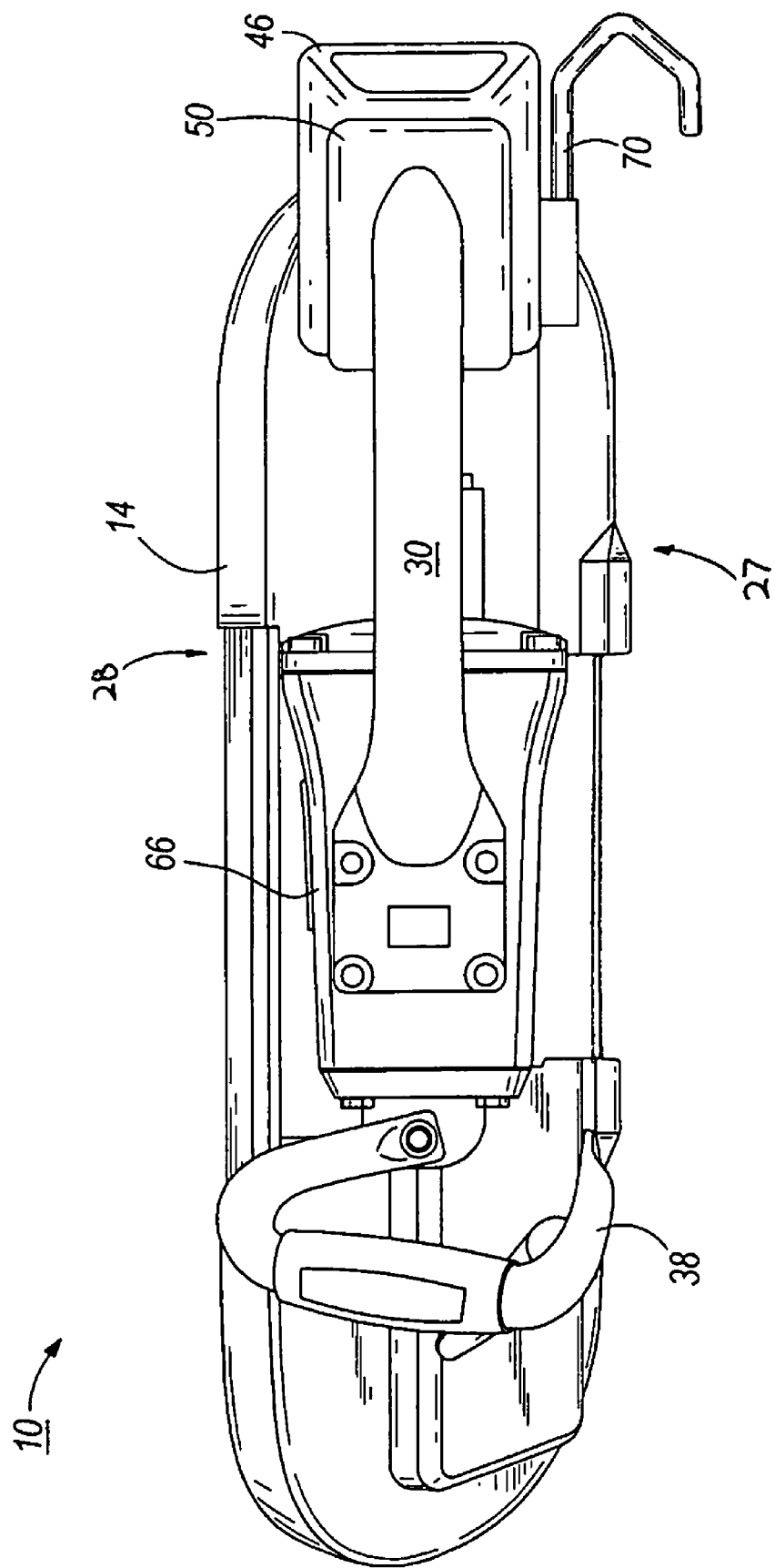
FIG. 14 is a top view of the band saw shown in FIG. 13.

In another construction (see FIGS. 9-10), the battery 46 may be suspended below the housing portion 54 so that the portion 54 and battery 46 form a generally T-shape. In yet another construction (see FIGS. 11-12), the battery may be supported on the front of the band saw 10 adjacent the front auxiliary handle 38 of the band saw 10. In a further construction (see FIGS. 13-14), the battery 46 is supported at the rear of the band saw 10, and the handles 30 and 38 are arranged in a "chain saw" arrangement. In still further constructions (not shown), the battery 46 may be arranged and supported in a different position on the band saw 10.

It should be understood that, for other aspects and in other constructions, the band saw 10 may be powered by another power source, such as, for example, an AC power source, another DC power source, a fluid power source, etc.

In some aspects and in the illustrated constructions (see FIGS. 1-14), the band saw 10 may generally include a DC motor 18 which generally operates at a slower speed than a comparable AC motor for an AC band saw. To accommodate the reduced speed, the gear ratio of the drive mechanism 22 may be changed. In one construction, only the third stage gearing (not shown) is changed to accommodate the reduced speed of the DC motor 18. It should be understood that, in other constructions, the drive mechanism 22 may have a different gearing arrangement (single stage, two stage, etc.) and/or that other stage(s) of the gearing arrangement may be modified to accommodate the reduced speed of the DC motor 18.

It should be understood that, for other aspects and in other constructions, the band saw 10 would include a motor which is powered by the provided power source, such as, for example, an AC motor, a different DC motor, a fluid powered motor source, a switched reluctance motor, etc.

In some aspects and in illustrated constructions (see FIGS. 1-14), the band saw 10 may generally include an illumination device 58, such as, for example, an LED, a light, etc., arranged and supported to illuminate the band saw blade 26, the work piece W and/or the work area. In some constructions (see FIGS. 7-8), the illumination device 58 may be incorporated into an existing part of the band saw 10, such as, for example, into a brush cover 62. In some constructions, the illumination device 58 may be built into the housing 14 or into a motor housing 66. In some constructions, the band saw 10 may include multiple illumination devices 58.

In yet other constructions (not shown), the illumination device 58 may be separate from and supportable by a portion of the band saw 10. In such other constructions, the illumination device 58 may be removable and replaceable.

In some aspects and in the illustrated construction, the illumination device 58 is controlled by the switch assembly 34. In some constructions, in a first position of the switch assembly 34 (e.g., an initially depressed position from the Off position), the switch assembly 34 may provide power to the illumination device 58 to provide illumination while the motor 18 is not operated. In such constructions, in a second position (a further depressed position from the Off position), the switch assembly 34 provides power to the motor 18 to operate the motor 18 and to the illumination device 58 to provide illumination.

In such constructions, the band saw 10 may include a illumination deactivation device (not shown) so that the illumination device 58 is not activated, for example, if illumination is not needed, to conserve battery capacity (in constructions in which the band saw 10 is battery-powered), etc. Such an illumination deactivation device may include a deactivation switch (not shown) to selectively deactivate the illumination device 58. In such a construction, the operator can selectively deactivate the illumination device 58.

In another construction, the illumination deactivation device may include a sensor (not shown) operable to sense the ambient light condition and a controller (not shown) to cause deactivation of the illumination device 58 when illumination is not needed. The band saw 10 may also include a sensor (not shown) operable to sense the state of the capacity of the battery 46 and a controller (not shown) to cause deactivation of the illumination device 58 if the capacity of the battery 46 is below a threshold to conserve the battery capacity for operation of the band saw 10.

In other constructions, the band saw 10 may include a separate switch (not shown) to operate the illumination device 58.

In some aspects and in the illustrated construction, the illumination device 58 is powered by the same power source as the motor 18 (e.g., by the battery 46, by an AC power source, if provided, etc.). In other constructions, the illumination device 58 may include a separate power source (e.g., a separate battery).

In some aspects and in the illustrated constructions (see FIGS. 1-2 and 9-14), the band saw 10 may generally include a support or hook 70 for supporting the band saw 10 when not in use. In some constructions (see FIGS. 1-2, 9-10 and 13-14), the hook 70 may be fixed to the band saw 10 and may be movable between a use position, in which the hook 70 is operable to support the band saw 10 when the band saw 10 is not in use, and a stored position, in which the hook 70 is positioned so as not to interfere with operation of the band saw 10.

In other constructions (see FIGS. 11-12), the hook 70 may be connectable to the band saw 10 (see FIG. 11) to support the band saw 10 when the band saw 10 is not in use and removable from the band saw 10 (see FIG. 12) so that the hook 70 does not to interfere with operation of the band saw 10. In such a construction, the housing 14 defines a support portion 74 for selectively supporting the hook 70 on the housing 14. Such an arrangement between the hook 70 and the support portion 74 is similar to that described in co-pending U.S. patent application Ser. No. 10/389,070, filed Mar. 14, 2003, entitled TOOL AND ACCESSORY CONNECTING SYSTEM, the contents of which are hereby incorporated by reference.

In some aspects and in some constructions, the drive mechanism 22 may generally include a belt and pulley drive system (not shown) to drive the band saw blade 26 instead of the typical chain and sprocket drive assembly. The belt and pulley system may generally include one or more flexible belts extending between pulleys to drivingly connect the motor 18 to the drive wheel 40. The belt and pulley system generally has a reduced weight as compared to the chain and sprocket drive assembly.

In some aspects and with some constructions, the DC motor 18 is lighter than a corresponding AC motor. Also, in some aspects and with some constructions, the belt and pulley drive system is lighter than the corresponding chain and sprocket drive system. Further, in some aspects and with some constructions, the cord is eliminated which reduces weight. These reductions in weight of the band saw 10 may accommodate the added weight of the battery 46 so that the cordless band saw 10 is lighter than or, at most, substantially the same weight as a corresponding corded band saw.

In some aspects and in some constructions (see FIG. 15), the band saw 10 may include a mechanism 78 to pivot or adjust the plane of the band saw blade 26 to perform cuts at varying angles. For example, in the position shown in the middle view of FIG. 15, the band saw blade 26 is generally oriented at a non-perpendicular angle with respect to the housing 14 (e.g., 45°). This is the position in which the band saw blade 26 is oriented in FIGS. 1-6. In this position (e.g., a cut-off position), the band saw 10 may be used to cut a work piece W in the middle of the work piece W. For example, the band saw 10 may be used to cut a pipe (not shown) in the middle of the pipe.

In the position shown in the upper view of FIG. 15, the band saw blade 26 is oriented at a generally perpendicular angle with respect to the housing 14. In this position (e.g., a rip position), the band saw 10 may be used to cut the end of a work piece W which has a depth greater than the opening 82 in the housing 14. For example, the band saw 10 may be used to cut the web of a I-beam (not shown) which is typically twelve inches in height.

The adjustment mechanism 78 provides adjustment between the non-perpendicular or cut-off position (shown in the middle view of FIG. 15) and the perpendicular or rip position (shown in the upper view of FIG. 15). As shown in FIG. 15, the adjustment mechanism 78 includes a movable saw blade guide 86. In the illustrated construction, the guide 86 is pivotably supported by the housing 14 for movement between the cut-off position and the rip position. The guide 86 defines an arcuate slot 90 in which a pin 94 is movable to guide movement of the guide 86 and to maintain the position of the band saw blade 26 relative to the housing 14 and relative to the drive wheel 40 and the idler wheel 42.

In such constructions, the band saw 10 may include a locking mechanism (not shown) for locking the mechanism 78 in the cut-off position or in the rip position. It should be understood that the mechanism 78 may be operable to other positions and that the locking mechanism may be operable to lock the mechanism 78 in such other positions.

Figure 16:
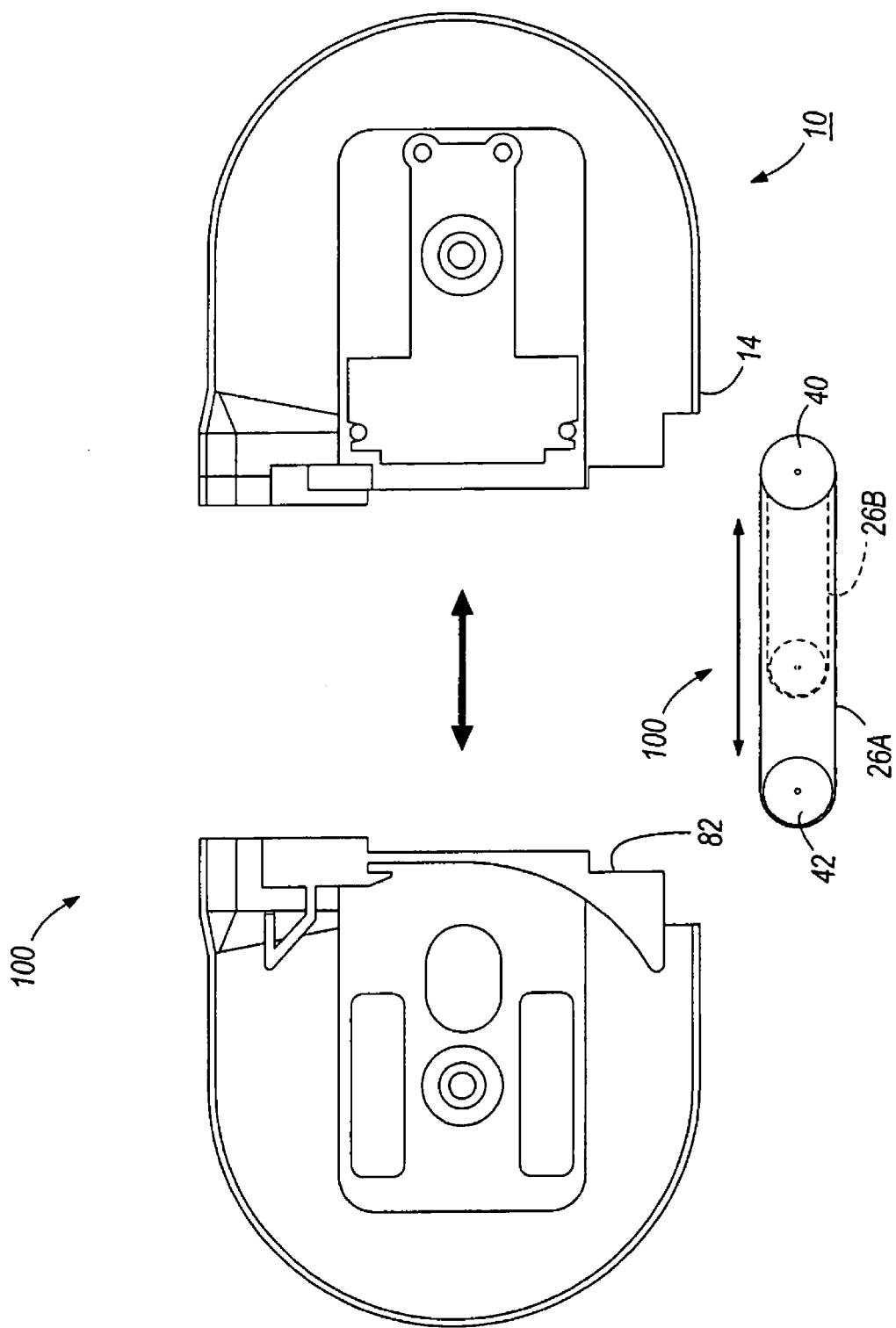
FIG. 16 includes views of a portion of yet another alternative construction of a band saw.
Figure 17:
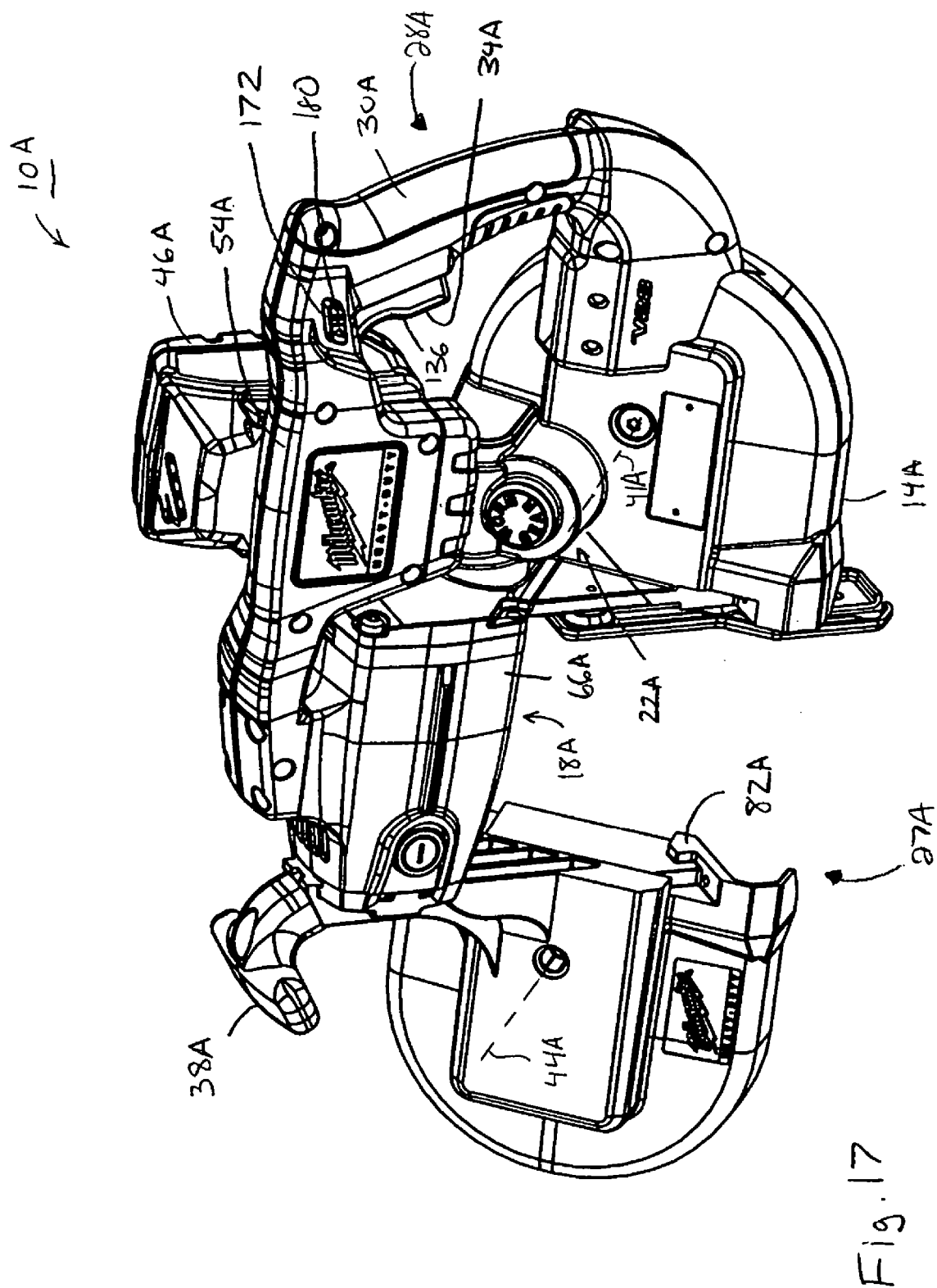
FIG. 17 is a side perspective view of a further alternative construction of a band saw.
Figure 18:
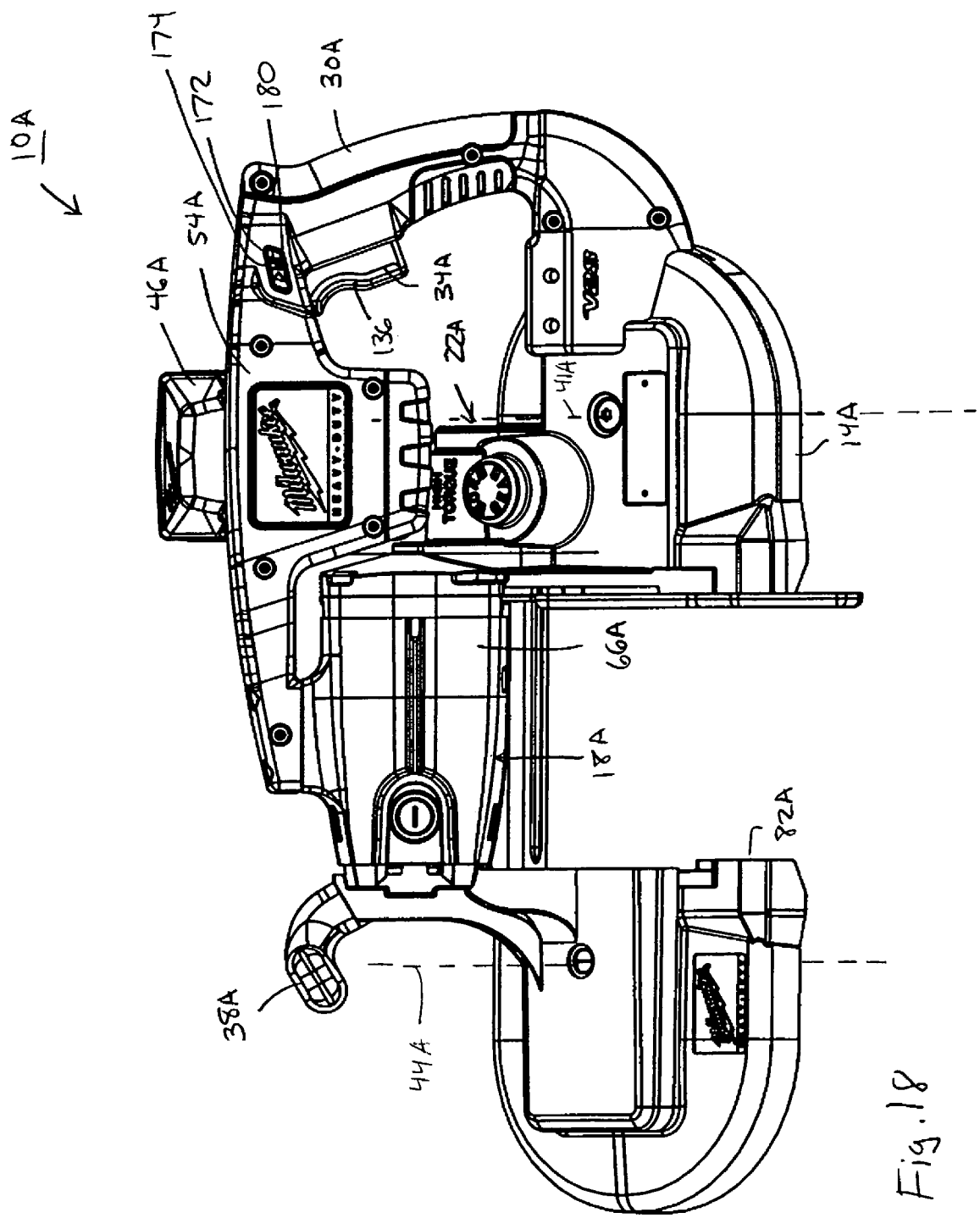
FIG. 18 is a side view of the band saw shown in FIG. 17.
Figure 19:
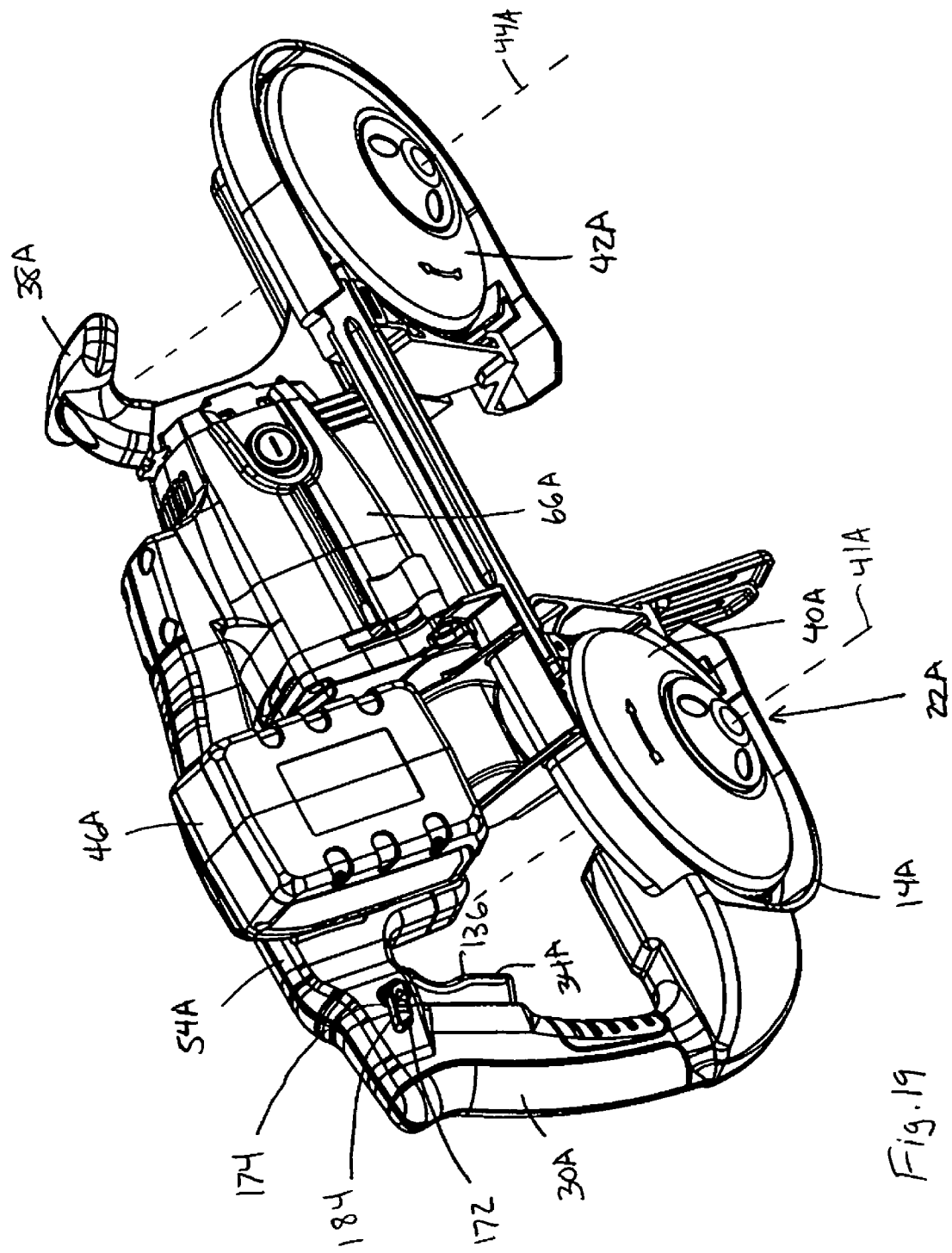
FIG. 19 is another side perspective view of the band saw shown in FIG. 17.
Figure 20:
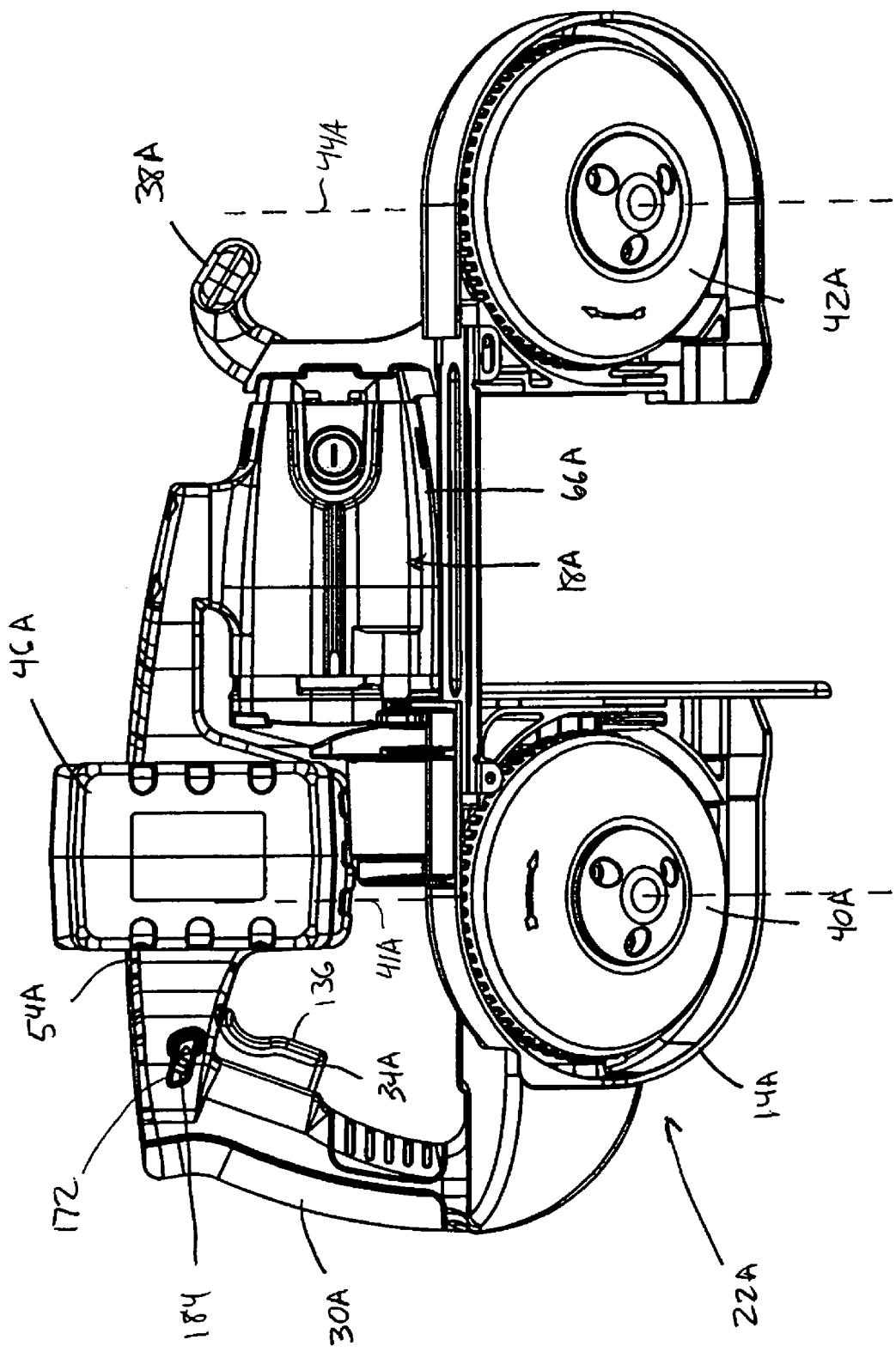
FIG. 20 is another side view of the band saw shown in FIG. 17.
Figure 21:
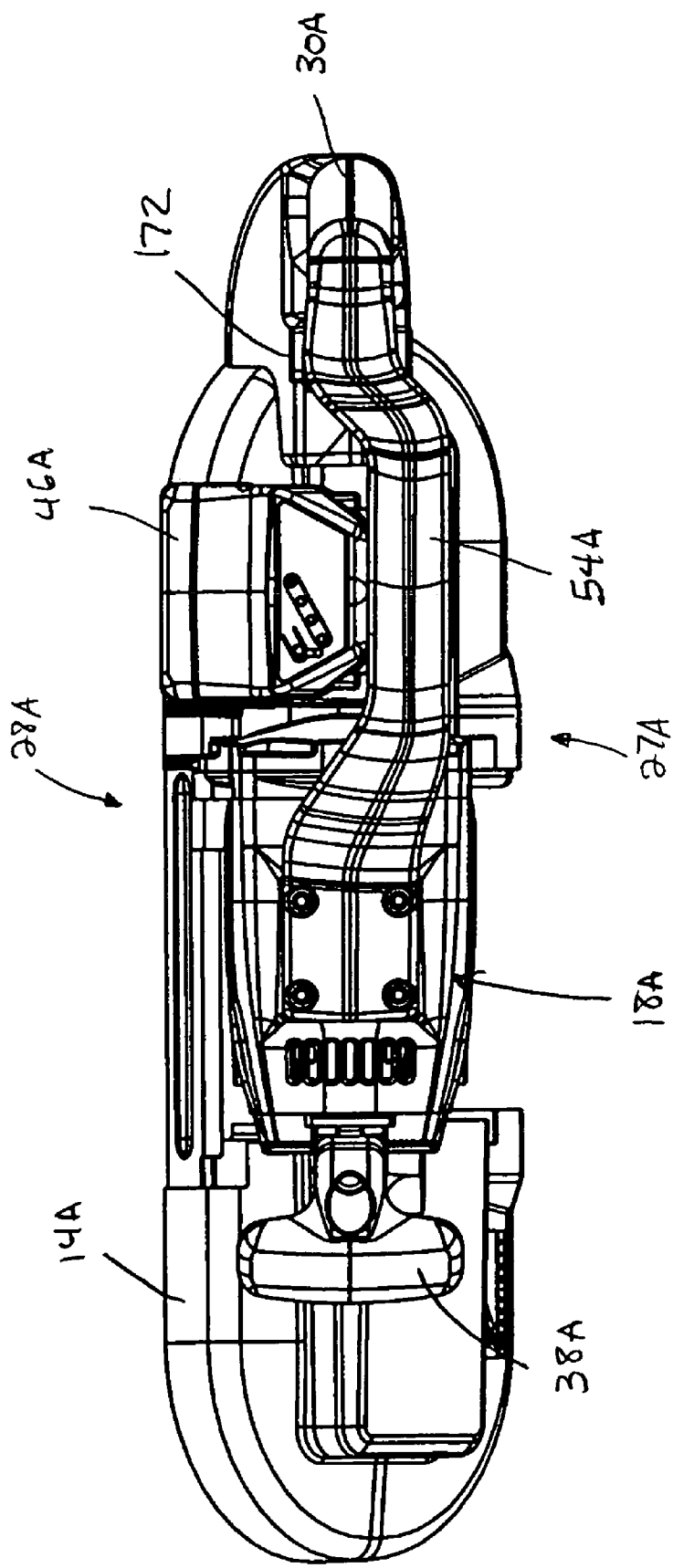
FIG. 21 is a top view of the band saw shown in FIG. 17.
Figure 22:
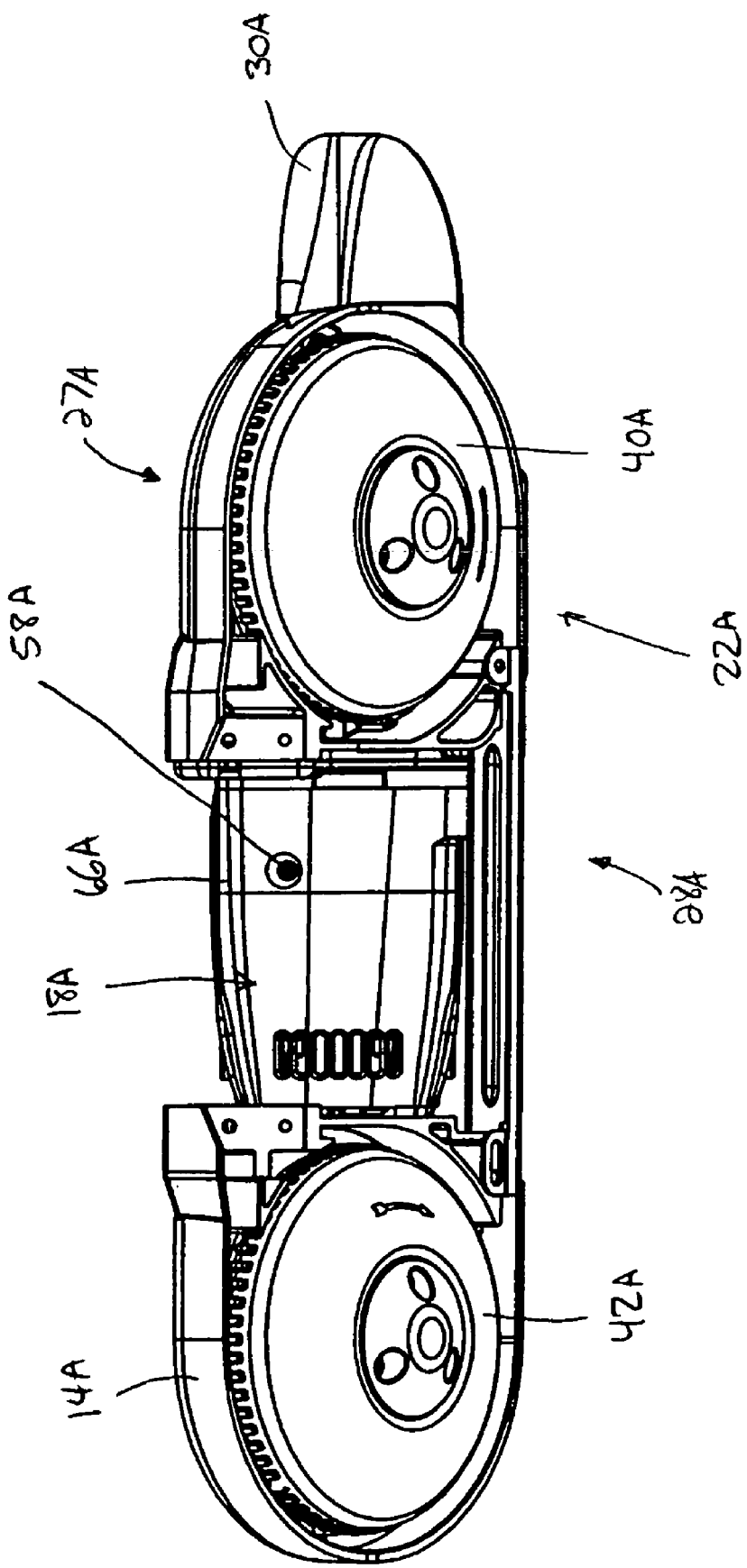
FIG. 22 is a bottom view of the band saw shown in FIG. 17.

In some aspects and in some constructions (see FIG. 16), the band saw 10 may generally include a mechanism 100 to adjust the distance between the drive wheel 40 and the idler wheel 42. The mechanism 100 is adjustable between a first length, to accommodate a band saw blade 26A having a first length, and a second position, to accommodate a band saw blade 26B having a second length which is different than the first length. The mechanism 100 enables the size of the opening 82 to be adjusted to accommodate different size work pieces.

In such a construction, the motor 18 may be positioned over the drive wheel 40. The blade guard (not shown) and housing 14 may include structure (not shown) to accommodate movement of the wheels 42 and 46 relative to one another and to fix the distance between the wheels 42 and 46.

In some constructions and in some aspects, the band saw 10 may include a motor 18 which is operated at multiple operator-selected speeds. For example, the band saw 10 may include a mechanism (not shown) for operating the motor at a slower first speed, for example, for metal cutting, and a faster second speed, for example, for cutting wood. The band saw 10 may include a switch mechanism (not shown) for controlling the motor 18 at least these two speeds. It should be understood that the motor 18 may be operated at other speeds, for example, for cutting other materials.

FIGS. 17-24 illustrate an alternative construction of a band saw 10A embodying some aspects of the invention. Common elements of the band saw 10A are identified by the same reference number "A".

As shown in FIGS. 17-21 and 23-24, in some aspects and in the illustrated construction, the band saw 10A is battery powered. The band saw 10A is operable with a battery 46A which selectively powers the motor 18A. In the illustrated construction, the battery 46A has a nominal voltage of at least 26 V to provide sufficient power to the motor 18A for cutting metal, wood, etc. It should be understood that, in other constructions, the battery 46A may have a lower nominal voltage (e.g., 12 V, 18 V, 24 V, etc.) or a higher nominal voltage (e.g., 28 V, 40 V, etc.) as required by the performance requirements of the band saw 10A. In the illustrated construction, the battery 46A may be similar to that described in the co-pending U.S. utility and provisional patent applications discussed above with respect to battery 46. In the band saw 10A, the battery 46A is generally positioned to consider at least one of the following: line of sight of the band saw blade (not shown) and work piece (not shown); balance and/or center of gravity of the band saw 10A; protection of the battery 46A (including from impacts, temperature (ambient and/or resulting from operation of the band saw 10A and/or battery 46A) contaminants, etc.); ease of removal and/or replacement of the battery 46A; visibility of the battery 46A (e.g., of the battery fuel gauge, if provided); etc.

In the illustrated construction and in some aspects, with the positioning of the battery 46A on the housing 14A, an operator may easily remove and replace the battery 46A while supporting the band saw 10A. With one hand, the operator holds the handle 30A with the band saw 10A generally hanging downwardly (for example, in FIG. 18, with the handle 30A above the handle 38A). With the other hand, the operator grips the battery 46A and operates the locking assembly, if provided, to release the battery 46A from the band saw 10A. While still holding the handle 30A, the operator may then re-connect the battery 46A to the battery support portion 50A or may replace the battery 46A with another battery (not shown).

In the illustrated construction and in some aspects, with the positioning of the battery 46A on the housing 14A, portions of the battery 46A, such as, for example, the fuel gauge on the battery 46A, are visible to and/or operable by the operator during operation of the band saw 10A.

In the illustrated construction, the battery 46A is positioned on the rearward side of the band saw 10A generally behind a portion 54A of the housing 14A which extends between and connects the handles 30A and 38A. In the illustrated construction and in some aspects, to accommodate the battery 46A, the housing portion 54A is curved forwardly. This forwardly curved portion 54A does not interfere with the line of sight of the band saw blade or with operation of the band saw 10A. By positioning the battery 46A to the rearward side of the housing 14A, the battery 46A also does not interfere with the line of sight of the band saw blade or with the operation of the band saw 10A and is not in a region which may be most frequently subject to impacts. This forwardly curved portion 54A also minimizes the extent to which the battery 46A projects to the rearward side of the housing 14A.

The position of the battery 46A and the motor 18A also generally maintains the center of gravity and balance of the band saw 10A. In this position of the battery 46A, the band saw 10A is operated with a good line of sight and good balance, and the battery 46A is protected and easily removable and replaceable.

The location of the battery 46A relative to the band saw 10A also improves the cutting ability of the band saw 10A. The weight of the battery 46A is generally located above the location where the band saw blade 26A performs cutting operations on work pieces W (the cutting position). Also, the location of the battery generally positions the center of gravity of the band saw 10A over the cutting position. The added weight from the battery above the cutting position and the center of gravity over the cutting position apply additional downward weight or force on the work piece W, which reduces the amount of downward force required by the user and reduces the time required for each cutting operation. In operation, a user holds the band saw 10A over the work piece W and begins cutting the work piece W. Once cutting begins, the weight of the band saw 10A and the balance of the band saw are such that the band saw 10A, under its own weight, is sufficient to complete cutting of the work piece without any additional downward force applied by the user and the band saw only requires a small amount of balancing support by the user to maintain balance during cutting.

FIGS. 25-30 illustrate the arrangement of the housing 14A and the battery support portion 50A. In the illustrated construction and in some aspects, a portion of the housing 14A including the handle 30A and the housing portion 54A is formed as a two-piece assembly. The assembly includes housing portions 104 and 108 which are secured together. As shown in FIG. 25, the housing portion 108 defines an opening 112, and the battery support portion 50A projects through the opening 112.

In the illustrated construction and in some aspects, the connector block or battery support portion 50A provides a modular assembly for physically supporting the battery 46A on the housing 14A and for electrically connecting the battery 46A to the motor 18A. The battery support portion 50A includes structure 116 for physically supporting the battery 46A. In the illustrated construction, the structure 116 includes rails and grooves which are complementary to and which cooperate with the rails and grooves on the battery 46A. The structure 116 can be configured in a variety of manners to accommodate batteries with various connecting configurations such as, for example, tower power tool batteries.

The battery support portion 50A also includes structure 120 for electrically connecting the battery 46A to the motor 18A. In the illustrated construction, the structure 120 includes a terminal assembly which is complementary to the terminal assembly on the battery 46A. The terminal assembly is electrically connected to the motor 18A by an electrical circuit (not shown). The terminal assembly of the structure 120 can be configured in a variety of manners to accommodate various configurations of terminal assemblies of batteries.

As shown in FIG. 28, a portion 124 of the battery support portion 50A engages a portion 128 of the housing 108 adjacent the periphery of the opening 112 to restrict movement of the battery support portion 50A outwardly through the opening 112. When the housing portions 104 and 108 are connected, a portion 132 of the housing portion 104 engages the rearward portion of the battery support portion 50A to sandwich the battery support portion 50A between the housing portions 104 and 108. The housing portions 104 and 108 are connected by suitable fasteners such as, for example, screws, and provide a compression retention of the battery support portion 50A.

As shown in FIGS. 25-26 and 28, the battery support portion 50A projects through an opening 112 in the side wall of the housing 14A and is captured between the housing portions 104 and 108. In other constructions of power tools (not shown), the battery support portion is at least partially provided by the power tool housing. In such constructions (not shown) the handle halves are joined to define an opening (not shown) and any portion of the battery of the battery support portion not provided by the power tool housing (e.g., the terminal assembly) is supported in the opening between the housing halves.

To support the battery 46A, the rails and grooves on the battery 46A engage the structure 116 on the battery support portion 50A. The rails on the battery 46A are received in the grooves provided by the structure 116, and the rails on the structure 116 are received in the grooves on the battery 46A. In this manner, the battery 46A is physically supported on the battery support structure 50A, and support provided by the housing 14A directly to the battery 46A is unnecessary.

As the battery 46A is connected to the structure 116, the terminal assembly on the battery 46A engages the terminal assembly of the structure 120 of the battery support portion 50A. In this manner, the battery 46A is electrically connected to the electrical circuit and to the motor 18A.

The arrangement of the battery support portion 50A as a modular assembly reduces manufacturing tolerances so that the structure 116 for physically supporting the battery 46A and the structure 120 for electrically connecting the battery 46A provides improved support of the battery 46A on the band saw 10A. The battery 46A is more easily connectable to and removable from the battery support portion 50A, and, when the battery 46A is supported, the battery support portion 50A and the battery 46A maintain a tight alignment.

In contrast, in other common constructions of power tools (not shown), the structure for physically supporting a battery is formed separately from the structure for electrically connecting the battery to the circuit. These structures are then connected to provide a battery support portion for the battery.

For example, the structure for physically supporting the battery may be formed on the power tool housing (e.g., on the handle). The structure for electrically connecting the battery (e.g., the power tool terminal assembly) is formed separately and is then connected to the physical support structure on the handle (e.g., being sandwiched between the handle halves).

Manufacturing tolerances between the physical support structure and the handle halves and between such structure and the electrical connecting structure of the terminal assembly may cause the non-modular structures to be misaligned so that connection of the battery to the non-modular battery support portion and removal of the battery from such a battery support portion may be difficult. In other instances, the structures may be arranged so that the battery is loose when supported on such a battery support portion. In some aspects, the modular battery support portion 50A alleviates such conditions.

FIGS. 31-39 illustrate the switch arrangement for the band saw 10A. Generally, the switch arrangement includes a trigger assembly 136, a variable speed switch 140 and structure for limiting operating movement of the trigger 136.

The trigger 136 is depressed by one or more fingers of the operator. As the trigger 136 is depressed, the trigger 136 moves rearwardly (to the right in FIG. 31). Movement of the trigger 136 causes activation of the switch 140 so that power is supplied from the power source (e.g., the battery 46A) to the motor 18A.

The switch 140 is a variable speed switch, and the extent to which the trigger 136 is depressed and the switch 140 is operated controls the amount of power supplied to and the rotational speed of the motor 18A. The trigger 136 is movable from a rest position (shown in FIGS. 31 and 37), in which the switch 140 and the motor 18A are not operated, to a fully depressed position (shown in FIG. 39), in which the switch 140 is fully operated and the motor 18A is operated at a high or maximum speed.

Figure 35:
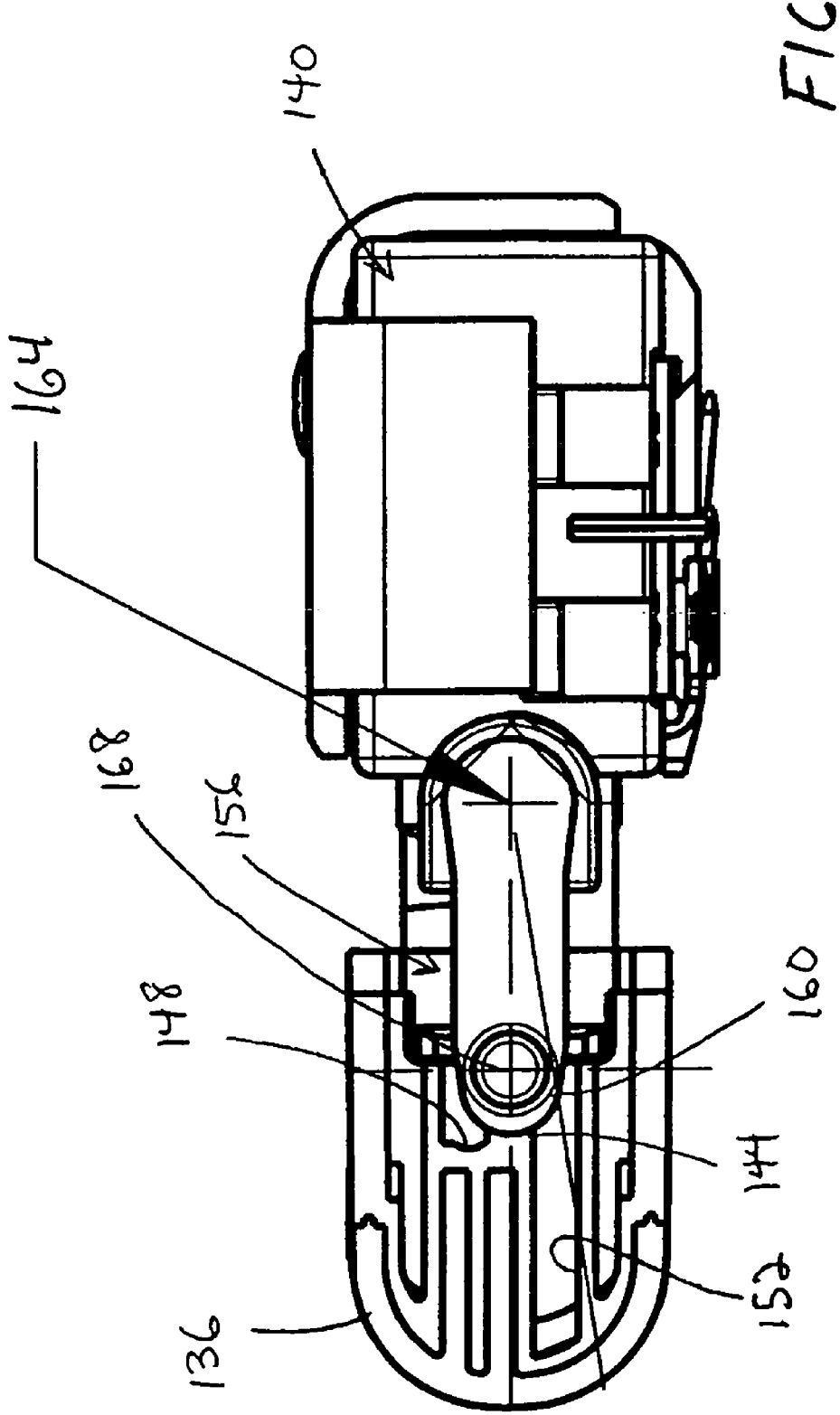
FIG. 35 is a top view of the switch shown in FIG. 31.
Figure 36:
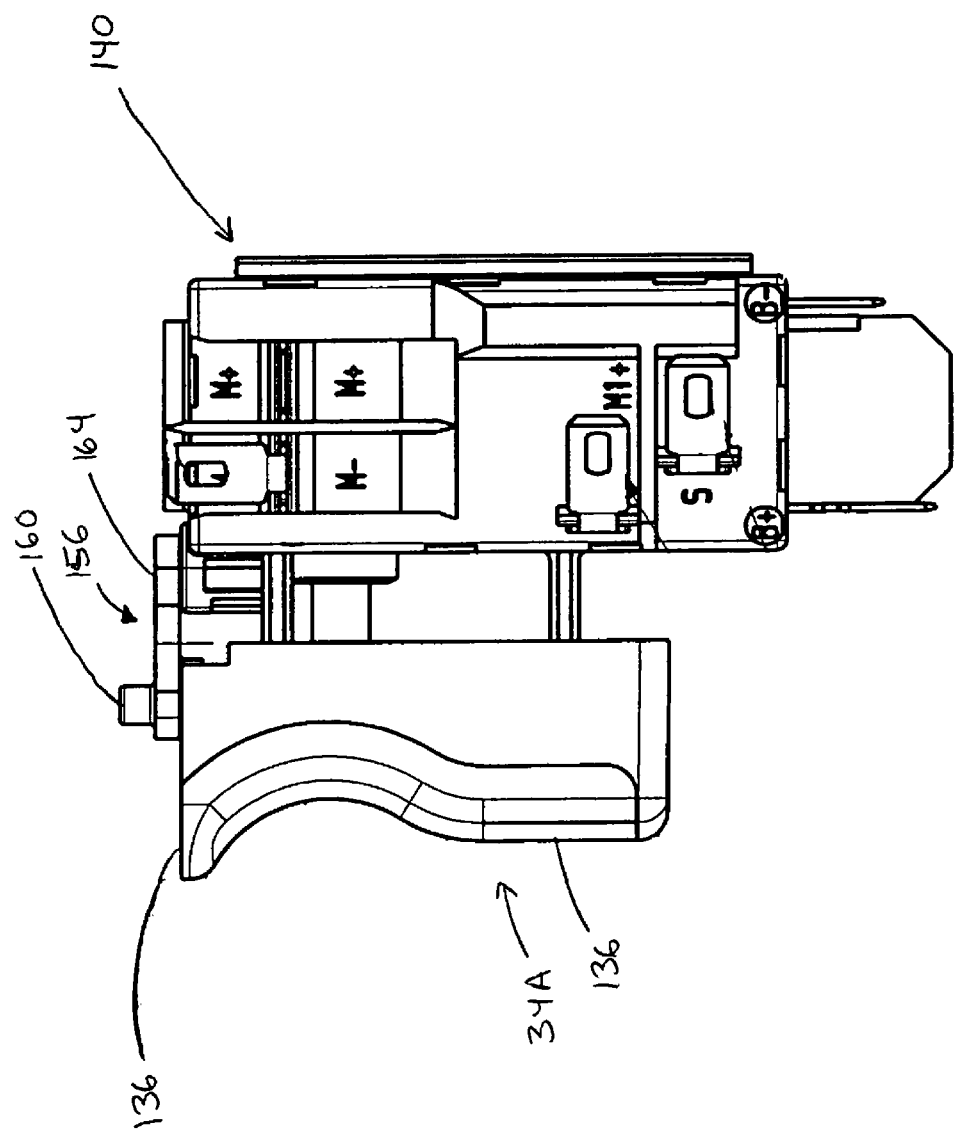
FIG. 36 is a side view of the switch shown in FIG. 31.
Figure 37:
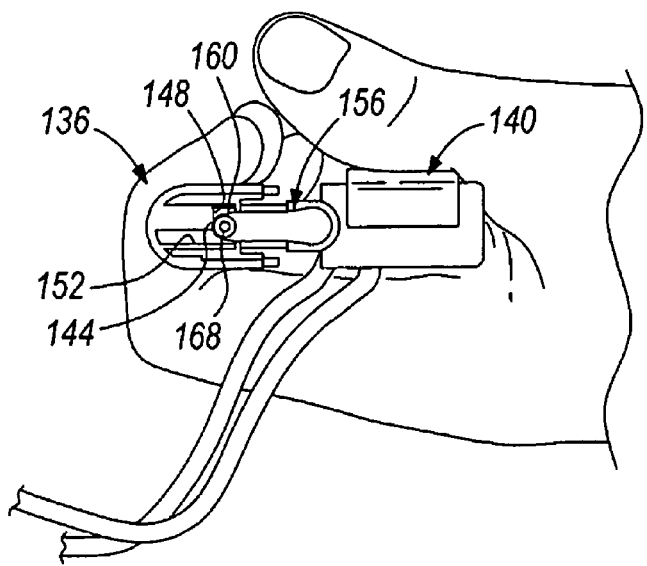
FIG. 37 is a top view of the switch shown in FIG. 35 and illustrating the switch in the lock position.

As shown in FIGS. 35 and 37, the trigger 136 has an upper portion on which several structural features 144, 148 and 152 are provided. A limiting member or arm 156 is supported for pivotal movement relative to the trigger 136. The arm 156 includes a forward engagement portion 160 and is pivotable about a pivot point 164. An actuating projection 168 extends upwardly from the arm 156.

In the position shown in FIGS. 35 and 37, the engagement portion 160 engages the stop feature 144 on the trigger 136 to substantially prevent rearward movement of the trigger 136 and to prevent actuation of the switch 140. This position is a lock position. In some constructions (such as the illustrated construction), in the lock position, the switch 140 is also electronically locked out so that current cannot be supplied from the power source to the motor 18A.

Figure 38:
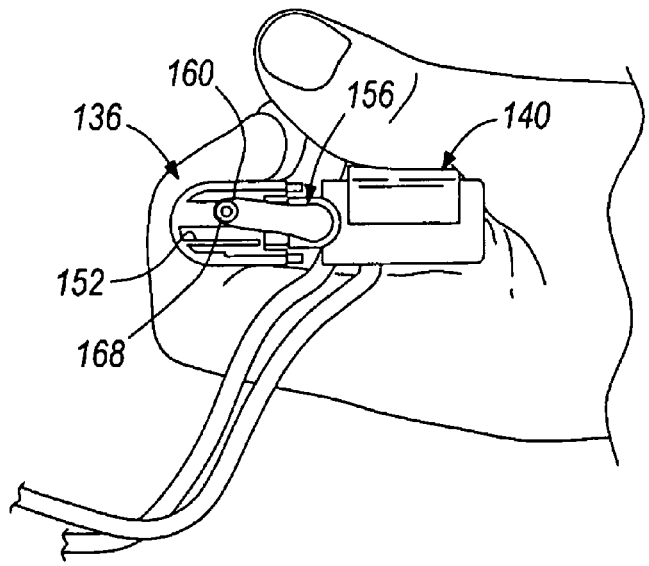
FIG. 38 is a top view of the switch shown in FIG. 35 and illustrating the switch in the first or low speed position.

As shown in FIG. 38, the arm 156 is pivoted to a first or low speed position, in which the engagement portion 160 is engageable with a first or low speed limiting feature 148 to limit the extent to which the trigger 136 is rearwardly movable. With the trigger 136 depressed so that the engagement portion 160 engages the feature 148, the switch 140 will be operated to supply power from the power source to the motor 18A so that the motor 18A operates at a speed which is less than the high or maximum operating speed. This is a low speed position of the switch arrangement.

Figure 39:
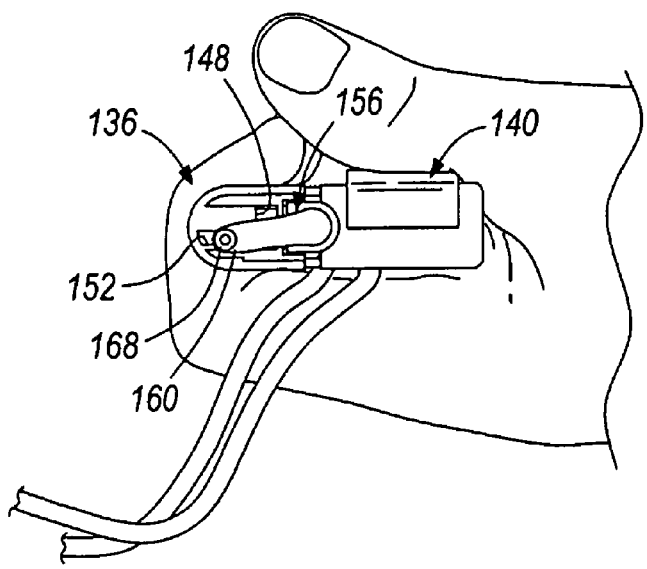
FIG. 39 is a top view of the switch shown in FIG. 35 and illustrating the switch in the second or high speed position.

As shown in FIG. 39, the arm 156 is pivoted to a position in which the engagement portion 160 is movable relative to a second or high speed feature 152. In this second or high speed position, the trigger 136 is movable rearwardly to its maximum extent so that the switch 140 is operated to supply maximum power to the motor 18A and so that the motor 18A operates at a high or maximum speed. This position is the high speed position of the switch arrangement.

With reference to FIGS. 32-34, the switch arrangement also includes an operating member 172 engageable by an operator to move the arm 156. In the illustrated construction, the operating member 172 is a shuttle switch which is slidable in an opening 174 defined in the housing 14A in proximity to the trigger 136. The operating member 172 includes a portion 176 engageable with the projection 168 on the arm 156. In the illustrated construction, the portion 176 defines an opening for receiving a projection 168.

FIGS. 32-34 illustrate the operation of the operating member 172. As shown in FIG. 32, the operating member 172 is in a centered position in which the engagement portion 160 of the arm 156 engages the stop feature 144 on the trigger 136 (the lock position). The operating member 172 is slidable to a first position (shown in FIG. 33), in which the arm 156 is pivotable to the position shown in FIG. 38 (the first or low speed position). The operating member 172 is slidable to a second position (shown in FIG. 34) in which the arm 156 is pivotable to the position shown in FIG. 39 (the second or high speed position). As shown in FIG. 17-20, indicators 180 and 184 are provided on the operating member 172 to indicate to the operator the position of the operating member 172 and the corresponding speed setting for the motor 18A.

Figure 40:
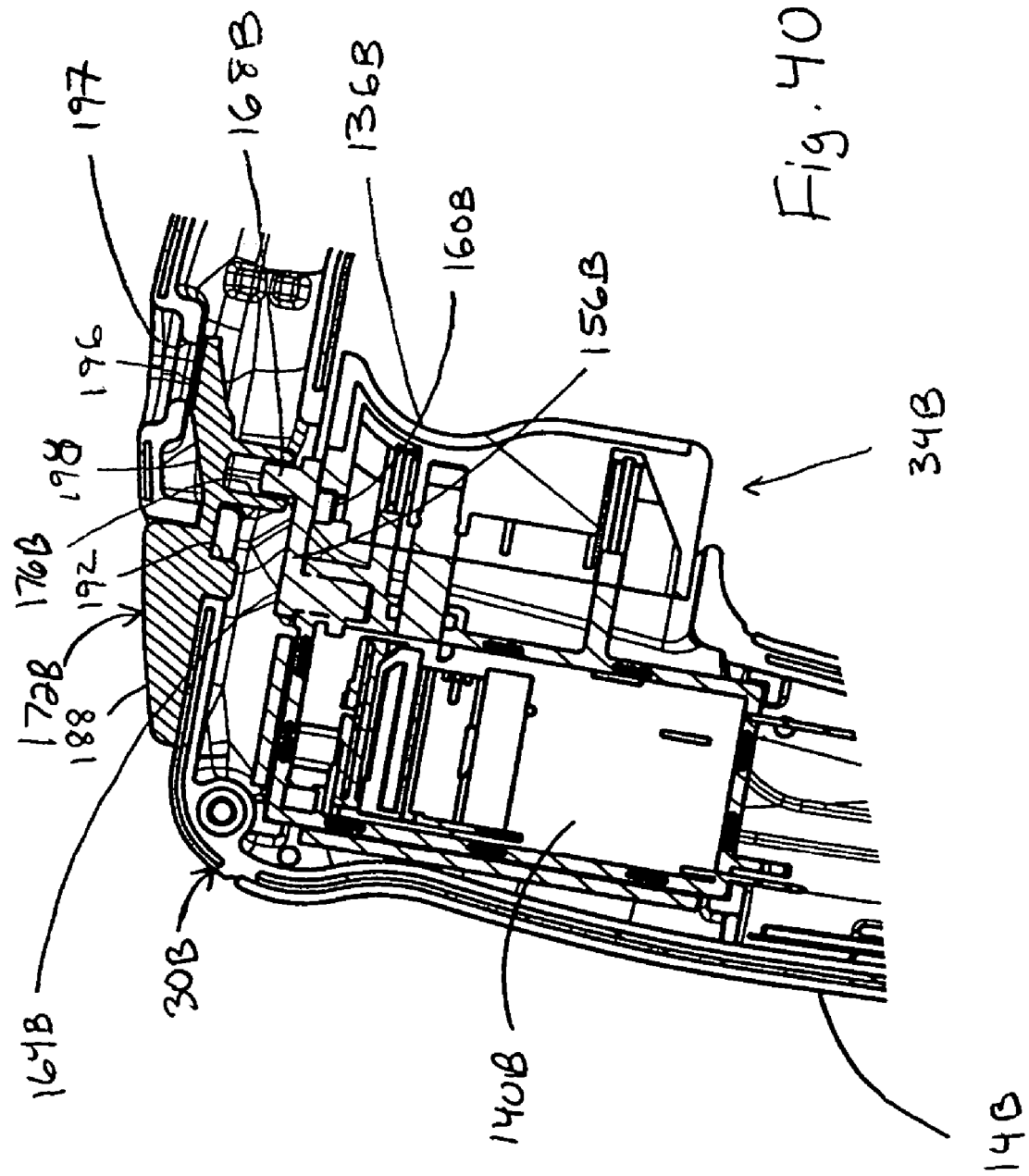
FIG. 40 is a side cross-sectional view of an alternative construction of a switch assembly.
Figure 41:
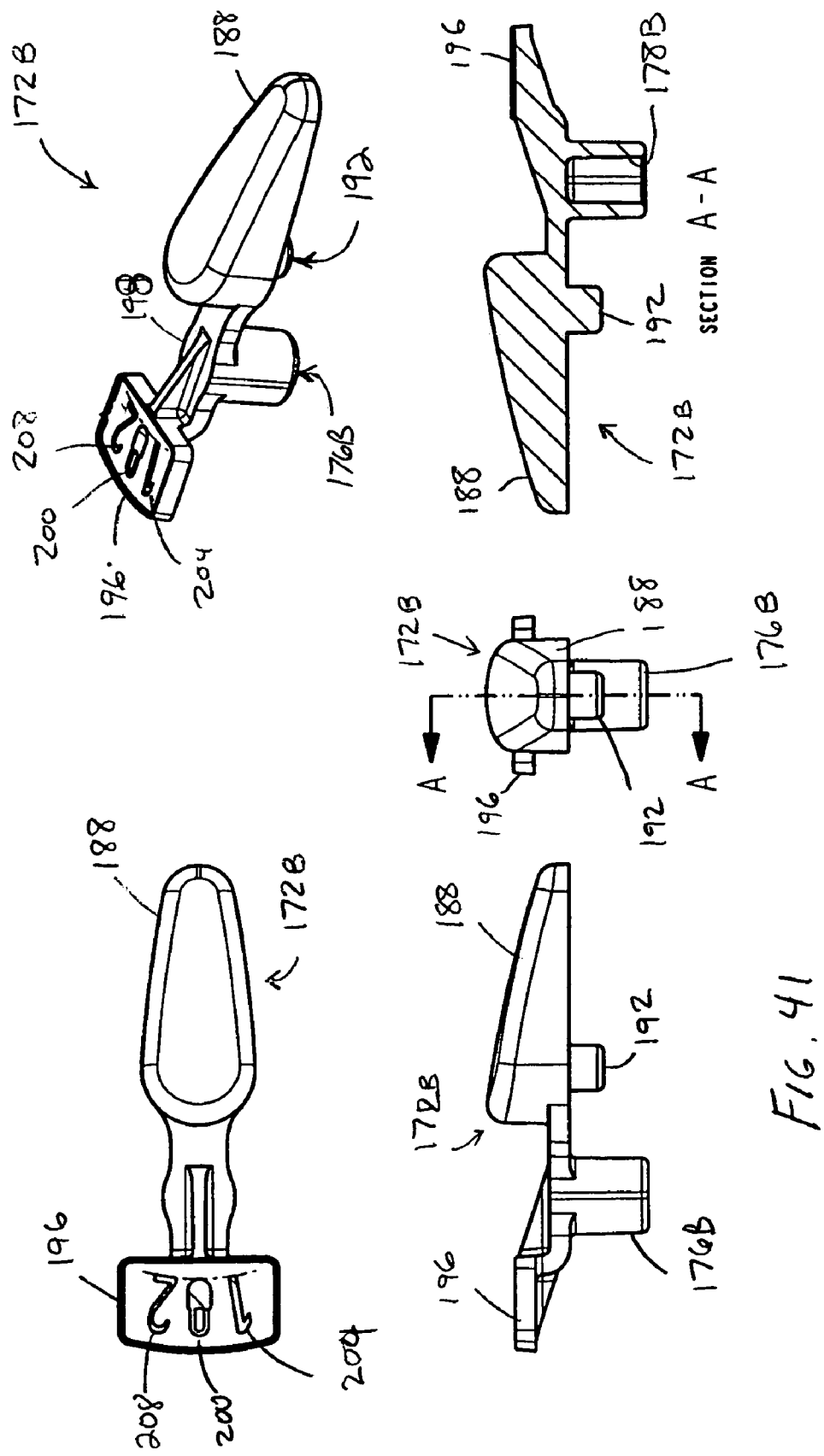
FIG. 41 are views of the operating member of the switch assembly shown in FIG. 40.

FIGS. 40-41 illustrate an alternative construction of an operating member 172B. Common elements of the operating member 172B are identified with the same reference number "B".

In the illustrated construction, the operating member 172B is supported for pivoting movement relative to the housing 14B to control operation of the arm 156B and to limit movement of the trigger 136B. The operating member 172B includes a paddle 188 which is engageable by an operator. The operating member 172B is supported for pivoting movement relative to the housing 14B about a pivot pin 192. A graphic area 196 is visible through a window 197 defined by the housing 14B. A central portion 198 of the operating member 172B is captured within the housing 14B. A switch interface portion 176B depends from the central portion 198 and is engageable with the upward projection 168B of the arm 156B. The graphic area 196 includes indicators 200, 204 and 208 to provide an indication to the operator of the position of the switch arrangement.

In operation, the operating member 172B is positionable in a center position in which the arm 156B is positioned as shown in FIG. 37. In this position, the trigger 136B is substantially prevented from moving rearwardly and the switch 140 is prevented from operating (the lock position).

The operating member 172B is pivotable in one direction to move the arm 156B to the position shown in FIG. 38. In this first or low speed position, the engaging portion 160B is engageable with a first or low speed feature (not shown but similar to the feature 148) to limit rearward movement of the trigger 136B so that the switch 140B operates the motor at a first or low speed.

The operating member 172B is pivoted to a second or high speed position in which the arm 156B is pivoted to the position as shown in FIG. 39. In this position, the engaging member 160B is movable relative to a second or high speed feature (not shown but similar to feature 152) so that the trigger 136B is fully rearwardly movable to cause the switch 140B to operate the motor at a second or high speed.

It should be understood that, in other constructions (not shown), the switch arrangement may provide fewer or more positions of the arm 156 and a corresponding number of operating speeds for the motor 18.

Although particular constructions embodying independent aspects of the present invention have been shown and described, other alternative constructions will become apparent to those skilled in the art and are within the intended scope of the independent aspects of the present invention.

The invention claimed is:
1. A band saw having a front and a rear, the band saw comprising:
   a housing including
      a first handle,
      a second handle spaced from the first handle, and
      a bridge extending between the first handle and the second handle, the bridge including a first portion proximate the first handle, a second portion proximate the second handle, and a third portion between the first portion and the second portion;

a motor supported by the housing;

a first wheel supported by the housing for rotation about a first wheel axis, the first wheel being coupled to the motor and driveable by the motor;

a second wheel supported by the housing for rotation about a second wheel axis;

a band saw blade extending around the first wheel and the second wheel and traveling in a continuous loop around the first wheel and the second wheel to cut a work piece and to define a cutting plane, the first wheel axis residing in a first wheel plane that is substantially normal to the cutting plane and the second wheel axis residing in a second wheel plane that is substantially normal to the cutting plane; and a battery including a fuel gauge, the battery removably supported by the bridge and electrically connectable to the motor for powering the motor, the entire battery being positioned between the first handle and the second handle such that the fuel gauge is visible during use of the band saw;

wherein a portion of the first handle is positioned outside a space between the first wheel plane and the second wheel plane;

wherein the third portion of the bridge curves toward the front of the band saw to define a recess, the battery being positioned in the recess, and outside the housing;

wherein the first portion and the second portion of the bridge each define a center axis that is spaced a first distance from the cutting plane; and wherein the third portion of the bridge defines a center axis that is spaced a second distance from the cutting plane less than the first distance.

2. The band saw of claim 1, wherein the battery is at least partially positioned between the first wheel plane and the second wheel plane.

3. The band saw of claim 1, wherein the battery is at least partially positioned between the first wheel axis and the second wheel axis.

4. The band saw of claim 1, wherein the motor defines a motor axis, the motor axis being in a motor axis plane parallel to the cutting plane, and wherein at least a substantial portion of the battery is positioned on a side of the motor axis plane opposite the cutting plane.

5. The band saw of claim 1, wherein the motor is positioned adjacent one of the first portion and the second portion of the bridge.

6. The band saw of claim 5, wherein the motor is positioned beneath the one of the first portion and the second portion of the bridge.

7. The band saw of claim 1, further comprising a blade tensioning mechanism coupled to the second wheel.

8. The band saw of claim 1, further comprising a battery support portion coupled to the third portion of the bridge.

9. The band saw of claim 8, wherein the battery support portion includes one of a projection and a groove, wherein the battery includes the other of the projection and the groove, and wherein the projection is received within the groove to secure the battery to the battery support portion.

10. The band saw of claim 9, further comprising a trigger switch electrically connected between the battery and the motor.

11. The band saw of claim 10, wherein the trigger switch is a variable speed trigger switch.

12. The band saw of claim 10, wherein the trigger switch includes a trigger, and wherein the battery is positioned between the trigger and the motor.

13. The band saw of claim 1, wherein the housing includes a motor housing portion containing the motor, and wherein the motor housing portion interconnects the second handle and the second portion of the bridge.

* * * * *